US008745138B2

(12) United States Patent  (10) Patent No.: US 8,745,138 B2
Feng  (45) Date of Patent: Jun. 3, 2014

(54) METHOD, APPARATUS AND SYSTEM FOR JOINING ONLINE GAME

(75) Inventor: Bowen Feng, Shenzhen (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 627 days.

(21) Appl. No.: 12/410,184

(22) Filed: Mar. 24, 2009

(65) Prior Publication Data

US 2009/0181767 A1    Jul. 16, 2009

Related U.S. Application Data

(63) Continuation of application No. PCT/CN2007/070790, filed on Sep. 26, 2007.

(30) Foreign Application Priority Data

Sep. 29, 2006  (CN) .......................... 2006 1 0140657
May 31, 2007  (CN) .......................... 2007 1 0108602
Jun. 14, 2007  (CN) .......................... 2007 1 0108683

(51) Int. Cl.
 *G06F 15/16* (2006.01)
(52) U.S. Cl.
 USPC ........................... 709/205; 709/204; 709/206
(58) Field of Classification Search
 USPC ............ 709/201, 202–206, 226, 227; 463/42
 See application file for complete search history.

(56) References Cited

U.S. PATENT DOCUMENTS 6,496,851 B1   12/2002  Morris et al.
6,699,125 B2 *  3/2004  Kirmse et al. ................... 463/42
7,240,093 B1 *  7/2007  Danieli et al. ................. 709/205
7,288,028 B2 * 10/2007  Rodriquez et al. .............. 463/42
7,664,816 B2 *  2/2010  Heron et al. .................... 709/204
7,819,749 B1 * 10/2010  Fish et al. ........................ 463/42
7,828,661 B1 * 11/2010  Fish et al. ........................ 463/42
2005/0021159 A1  1/2005  Ogawa
2005/0108352 A1  5/2005  Kashitani et al.
2006/0178216 A1 *  8/2006  Shea et al. ...................... 463/42

FOREIGN PATENT DOCUMENTS

CN       1478352 A    2/2004
CN       1577372 A    2/2005
CN     101073708 A   11/2007

(Continued)

OTHER PUBLICATIONS

International Search Report for Application No. PCT/CN2007/070790 dated Jan. 10, 2008.

*Primary Examiner* — Umar Cheema
(74) *Attorney, Agent, or Firm* — Marshall, Gerstein & Borun LLP

(57) ABSTRACT

A method for inviting an Instant Messaging (IM) user to join an online game is provided. An inviter generates a first instant message according to an online game selected by an inviter user, and sends the message to an invitee, where the first instant message contains description information describing the online game selected by the inviter user; after receiving an instant confining message returned by the invitee, which indicates that the invitee user agrees to join, the inviter requests according to the description information of the online game selected by the inviter user the game server of the online game to allocate game resources; after the game server successfully allocates the game resources, the inviter and the invitee respectively add the inviter user and the invitee user to the online game provided by the game server. The inviter is thus prevented from performing unnecessary operations.

38 Claims, 11 Drawing Sheets

(56) References Cited

FOREIGN PATENT DOCUMENTS

| CN | 101075941 A | 11/2007 |
| JP | 2004-97656 A | 4/2004 |
| KR | 20020039909 | 5/2002 |
| KR | 20030006183 | 1/2003 |
| KR | 10-2005-0095372 | 9/2005 |
| WO | WO-2005/010680 | 2/2005 |

* cited by examiner

METHOD, APPARATUS AND SYSTEM FOR JOINING ONLINE GAME

CROSS-REFERENCE TO RELATED APPLICATIONS

This is a continuation of International Application No. PCT/CN2007/070790, filed Sep. 26, 2007, which claims the priority benefit of Chinese Patent Application No. 2006101406573, filed Sep. 29, 2006; Chinese Patent Application No. 200710108602.9, filed May 31, 2007; and Chinese Patent Application No. 200710108683.2, filed Jun. 14, 2007, the entire respective disclosures of which are incorporated herein by reference.

FIELD OF THE INVENTION

The present invention relates to Internet technology, and particularly, to a method, apparatus and system for joining an online game.

BACKGROUND OF THE INVENTION

In the conventional art, parties that communicate with each other join an online game through the following process: the game inviter interacts with a game server to set up the game to be joined, then the inviter sends game information needed for setting up the game to invitees of the game; the invitees who decide to join the game visit the game server of the current game according to the received game information and provide the game server with the received game information; finally the game server adds the invitees into the game according to the game information provided by the invitees.

At present, the instant messaging technology and the online game technology can be combined. The Instant Messaging (IM) service is an Internet-based communication service, which mainly provides an instant communication function over networks. The IM service is widely applied and accepted on the Internet and may be provided by an IM system. With the rapid development of the Internet technology, both the instant messaging technology and the online game technology are developed and applied in a wide range. An IM user can invite other online IM users at any time to join an online game so as to promote the friendship among contacts through joining the same online game while communicating with the IM messages.

The conventional art is described hereinafter from the perspective of the IM service.

FIG. 1 is a schematic diagram illustrating a process in which an IM user invites another IM user to join one online game in accordance with the conventional art. The process mainly includes the following.

S1: In an IM system, the inviter invokes a Game Client A in the apparatus of the inviter, which is a software application installed in user equipment and corresponding to a game.

S2: The inviter starts to join an online game at the Game Server side through the invoked Game Client A.

S3: The Game Server activates the online game which the inviter joins and provides corresponding services for the activated online game.

S4: The Game Server provides detailed game information of the online game for the Game Client A of the inviter.

S5: The inviter creates an instant message for all contacts (i.e. the invitees) of the inviter according to the detailed game information provided by the Game Server and the instant message created includes invocation data used for invoking the online game.

S6: The inviter adds current game status information into the created instant message and sends the updated instant message to a Messenger Server.

S7: The Messenger Server routes the instant message from the inviter to all invitees.

S8: The IM clients of the invitees receive the instant message that includes the invocation data used for invoking the online game.

S9: Some of the invitees decide to join the online game.

S10: The invitees that decide to join the online game invoke corresponding game clients in the apparatuses of the invitees respectively to parse and list the invocation data in the instant message.

S11: The game clients of the invitees, based on the parsed invocation data, join the online game served by the Game Server.

S12: The game server accepts new players (i.e. the invitees) and the process of inviting a friend by instant messaging to join the online game is thus completed.

As can be seen from the preceding process, an IM user in the IM system functions as the inviter to launch the game client in the apparatus of the IM user, to join an online game provided by a game server through the game client, to send invocation data relevant to the invocation of the online game through the IM client in the apparatus of the inviter in the format of an instant message, and to forward the instant message by a messenger server to all IM contacts of the inviter as invitees. The invitees that decide to join the online game join the very online game provided by the game server according to the received invocation data, and thereby the inviter and the invitees can join the same online game.

In the inviting process described above, the IM user functioning as the inviter takes all his contacts as invitees after launching an online game successfully and then invites the invitees to the online game. However, if all invitees refuse to join the online game, it becomes futile for the inviter to launch the online game and resources of the inviter are wasted, In addition, because the inviter takes all his contacts as invitees and sends relevant invocation data to every invitee, such group transmission of relevant invocation data to the contacts without any specific aim definitely wastes transmission resources of the network. Furthermore, because the inviter sends the invocation data relevant to the invocation of the online game in the format of an instant message through the messenger server, the workload of the messenger server for forwarding the instant message will increase and the resources of the messenger server are wasted.

It should be noted that those disadvantages exist with online games provided in the IM system as well as with any other types of online games. The foregoing description is only an example based on the IM service.

SUMMARY OF THE INVENTION

Embodiments of the present invention provide a method for joining an online game, which solves the problem in existing technique that an inviter has to perform unnecessary operations while inviting a user to join an online game.

Embodiments of the present invention also provide a user apparatus of an inviter as well as a user apparatus of an invitee, which solves the problem in existing technique that the inviter has to perform unnecessary operations while inviting a user to join an online game.

Accordingly, embodiments of the present invention also disclose a system for a user to join an online game, which solves the problem in existing technique that the inviter has to perform unnecessary operations while inviting a user to join an online game.

Technical solutions according to embodiments of the present invention are as follows:

A method for joining an online game includes:

generating, by an inviter, a first message and sending the first message to an invitee, wherein the first message indicates the invitee to join an online game together with the inviter;

requesting, by the inviter, a server providing the online game to allocate game resources after receiving a confirmation message of agreeing to join the online game returned by the invitee; or requesting, by the invitee, the server providing the online game to allocate the game resources after receiving the first message;

joining, by the inviter and invitee respectively, the online game provided by the server after the server successfully allocates the game resources.

An inviter user apparatus includes:

an Instant Messaging (IM) client, configured to generate a first instant message according to an online game selected by an inviter user and send the first instant message to an invitee, wherein the first instant message contains description information for describing the online game selected by the inviter user;

a game client, configured to, after the user apparatus of the inviter receives an instant confirmation message returned by the invitee indicating that an invitee user agrees to join the online game selected by the inviter user, request according to the description information of the online game selected by the inviter user a server providing the online game to allocate game resources, and add the inviter user to the online game after the game resources are successfully allocated.

A user apparatus of an invitee includes:

an Instant Messaging (IM) client, configured to parse and display description information of an online game in a first instant message sent by an inviter for an invitee user, and to generate and send an instant confirmation message to the inviter after the invitee user agrees to join the online game;

a game client, configured to receive join information for indicating the invite user to join the online game provided by a server, and to add the invitee user to the online game according to the join information received.

A system for joining an online game includes an inviter, an invitee and a server;

wherein the inviter is configured to: generate a first instant message according to an online game selected by an inviter user and send the first instant message to the invitee, wherein the first instant message contains description information for describing the online game selected by the inviter user; and, after the inviter receives an instant confirmation message returned by the invitee indicating that an invitee user agrees to join the online game selected by the inviter user, request according to the description information of the online game selected by the inviter user the server providing the online game to allocate game resources, and add the inviter user to the online game after the game resources are successfully allocated;

the invitee is configured to parse and display the description information of the online game in the first instant message sent by the inviter for the invitee user, and generate and send the instant confirmation message to the inviter after the invitee user agrees to join the online game; and the server is configured to allocate the game resources and provide the online game according to a request of the inviter.

A system for joining an online game includes: a first client, a second client and a server;

the first client is configured to send to the second client a request of joining an online game; access the server providing services for the current game after receiving an instruction that the current game is established, and join the online game established currently;

the second client is configured to receive the request sent by the first client; determine the current game to join when accepting the request, and interact with the server providing services for the current game to establish the current game; and indicate the first client that the current game is established after the current game is successfully established.

An Instant Messaging (IM) client for joining an online game includes a user interface unit and a processing unit;

wherein the user interface unit is configure to receive a request for inviting an invitee user to join an online game, wherein the request is sent by an inviter user corresponding to the IM client where the inviter user is located, and to indicate the processing unit to process the request by an instruction;

the processing unit is configured to receive the instruction sent by the user interface unit, send a request for joining the online game to an IM client where an invitee user is located; and after receiving an instruction that the current game is established from the IM client where the inviter user is located, indicate a game client corresponding to the inviter user to join the online game established currently.

An Instant Messaging (IM) client for joining an online game, includes a user interface unit and a processing unit;

wherein the processing unit is configured to receive a request for joining an online game sent by an IM client in which an inviter user is located, and indicate the request for joining the online game to the user interface unit; after receiving an instruction that the invitee user accepts the request of the inviter user from the user interface unit, indicate a game client corresponding to the invitee user to establish the current game; and after receiving an instruction that the current game is established from the game client, indicate the IM client of the inviter that the current game is established by an instruction;

the user interface unit is configured to receive the request for joining the online game sent by the processing unit, and indicate the request for joining the online game to the IM client of the invitee user; receive the instruction that the invitee user accepts the request, and determine the current game to join according to the instruction received, and indicate the processing unit to establish the current game to join.

A system for joining an online game includes: a first client, a second client and a server;

wherein the first client is configured to send a request for establishing a current game to the server; receive relevant information of the online game sent by the server, and add a first client user to the current game according to the relevant information of the online game;

the second client is configured to receive the relevant information of the online game sent by the server, and add a second client user to the current game according to the relevant information of the online game;

the server is configured to receive the request for establishing the current game from the first client, allocate game resources for the current game, and store the relevant information of the online game for indicating the game resources; send the relevant information of the online game to the first client and the second client.

A server includes a client interface server and a game server;

wherein the client interface server is configured to receive a request for establishing a current game from an inviter, assign a game server to provide services for the current game, and store relevant information of the online game that indicates that the game server provides game resources; send the relevant information of the online game to parties participating the current game including the inviter;

the game server is configured to receive the relevant information of the online game, and provide services for the current game for the parties to which the relevant information of the online game is sent.

In the technical scheme of the embodiments of the present invention, only after the invitee user agrees to join the online game initiated by the inviter user, will the inviter user requests the game server at the network side for corresponding game resources and join the online game provided by the game server, thereby preventing the inviter user from performing unnecessary operations and saving operation processing resources of the user apparatus of the inviter.

BRIEF DESCRIPTION OF THE DRAWINGS

The basic idea and embodiments of the technical scheme provided by the present invention will be described in detail with reference to the accompanying drawings.

DETAILED DESCRIPTION OF THE INVENTION

In view of technical disadvantages of existing techniques, embodiment of the present inventions provide a solution mainly includes the following: only after an invitee agrees to join an online game initiated by an inviter or only after the invitee receives a first message from the inviter to invite the invitee to join the online game, would the inviter requests a game server providing the online game to allocate game resources; and the inviter and invitee join the online game respectively after the game resources are successfully allocated. According to the solution, the inviter is prevented from performing an unnecessary operation or process and thus operation and processing resources of an user apparatus of the inviter are saved.

Meanwhile, the inviter user selects an invitee user pertinently, and invites the selected invitee user by way of an instant message, thereby saving network transmission processing resources effectively. Furthermore, when the inviter and the invitee intercommunicate an invitation message or join information for joining an online game, the instant message corresponding to the invitation message or the join information is transmitted by way of Peer to Peer (P2P) or User Datagram Protocol (UDP), which does not need the messenger server to forward the instant message corresponding to the invitation message or the join information. Therefore, the workload of messenger server for forwarding an instant message can be reduced.

Besides, the inviter just needs to select an online game to be initiated and a contact to be invited, and then the user apparatus in which the inviter user is located automatically invites the contact to join the selected online game. After the contact agrees to join the online game, the user apparatus in which the inviter user is located automatically connects the game server at the network side, adds the inviter user to the corresponding online game, and sends relevant join information to the invitee so that the invitee can automatically add the invitee user to the online game according to the received join information. Consequently, the operations are pretty convenient for the inviter user or the invitee user, no redundant manual operations are needed, and therefore experience of users is greatly improved.

Figure 1:
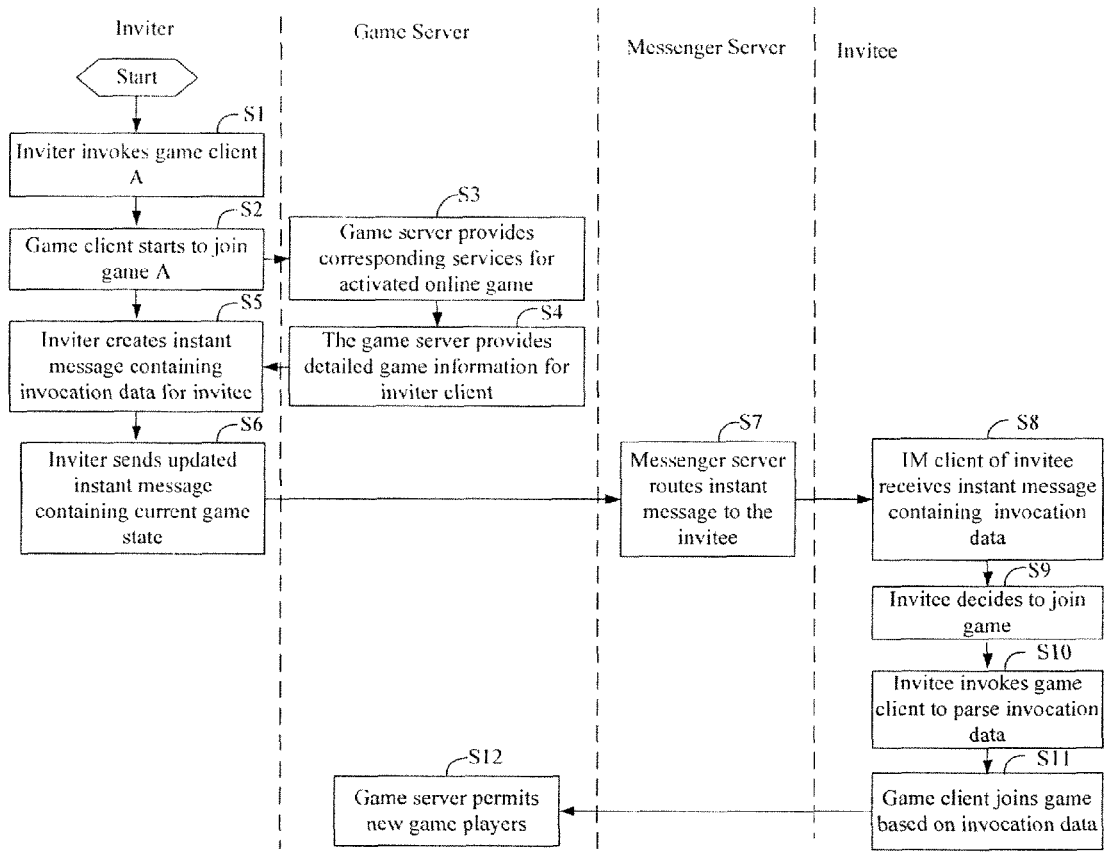
FIG. 1 is a schematic diagram illustrating a process in which an IM user invites other IM users to join an online game in the prior art.
Figure 2:
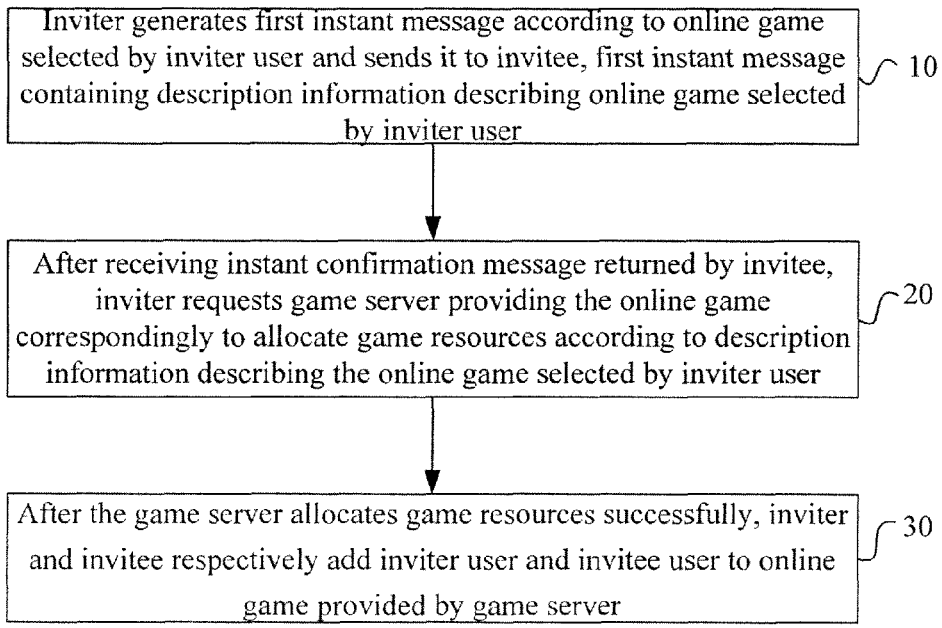
FIG. 2 is a flowchart illustrating a method for inviting an IM user to join an online game in accordance with Embodiment 1 of the present invention.

FIG. 2 is a flowchart illustrating a method for inviting an IM user to join an online game in accordance with Embodiment 1 of the present invention. With reference to FIG. 2, the method mainly includes the following.

In Block 10, an inviter generates a first instant message according to an online game selected by an inviter user and sends the instant message to an invitee. The first instant message generated contains description information for describing the online game selected by the inviter user (e.g., the description information may include but not limited to identity information of an online game, namely Game ID), and the online game is the game which the inviter intends to initiate and which the inviter will join together with the invitee. Preferably, the inviter directly sends the first instant message generated to the invitee by way of P2P or UDP, or alternatively to the messenger server and the messenger server then processes and forwards the first instant message to the invitee. The inviter generates and sends the first instant message to the invitee mainly through the following process:

the game client (or IM client) of the inviter provides an online game list for the inviter user, for instance, the IM client may provide the online game list by loading a subset of components provided by a game lobby and the game list is retrieved by the subset of components from the game server; the game list may be displayed by the IM client, and the game list can thus be shown;

the IM client of the inviter generates the first instant message according to the online game selected from the online game list by the inviter user; the first instant message containing the description information for describing the online game selected by the inviter user;

the IM client of the inviter takes the contacts selected by the inviter user as the inviter users, and sends the first instant message generated above to the invitee users.

In Block 20, after receiving from the invitee user an instant confirmation message indicating that the invitee user agrees to join the online game selected by the inviter user, the inviter user requests the game server providing the online game at the network side to allocate game resources according to the description information of the online game. The invitee returns the instant confirmation message to the inviter mainly through the following process:

the IM client of the invitee parses and displays the received description information of the online game contained in the first instant message to the invitee user, so as to inquire whether the invitee user agrees to join the online game initiated by the inviter user;

if the invitee user decides to join the online game, the invitee user sends to its IM client an instruction indicating agreeing to join, and the IM client of the invitee generates a corresponding instant confirmation message after the IM client of the invitee receives the instruction indicating agreeing to join the online game from the invitee user and sends the instant confirmation message to the inviter; preferably, the LM client of the invitee sends the instant confirmation message to the inviter by way of P2P or UDP directly, or alternatively to the messenger server and the messenger server then processes and forwards the instant confirmation message to the inviter.

The inviter requests the game server providing the online game at the network side to allocate game resources mainly through the following process:

according to the description information of the online game selected by the inviter user (such as Game ID information), the game client of the inviter selects a game server at the network side providing the online game; the game client of the inviter can select according to the Game ID information selected by the inviter user a game server with the least online clients from all game servers providing the online game, or the game client of the inviter can configure a selection strategy in advance (e.g. configure the ID of a game server to be selected) and select a game server from those game servers providing the online game according to the selection strategy, and then the game client of the inviter requests the game server to allocate corresponding game resources.

In Block 30, after the game server allocates the game resources successfully, the inviter adds the inviter user to the online game provided by the game server and the invitee adds the invitee user to the online game provided by the game server. Thereby, the inviter user invites an invitee user to join an online game for entertainment together successfully.

After the game server providing the online game allocates the game resources successfully, there are several manners to add a user to the online game. In one manner, the game client of the inviter can add the inviter user to the online game provided by the game server according to the join information preset by the inviter user to join the online game, such as Room ID, Table ID and Seat ID. In another manner, after allocating the game resources successfully, the game server at the network-side sends to the game client of the inviter specific join information used for joining the online game, such as Room ID, Table ID and Seat ID, so that the game client of the inviter can add the inviter user to the online game according to the specific join information sent by the game server.

After the inviter user successfully joins the online game, the invitee user can join the online game in at least the following two manners.

In one manner, after successfully adding the inviter user to the online game provided by the game server, the game client of the inviter sends an identity of the invitee (such as IP address information of the invitee) to the game server; and according to the received identity information of the invitee, the game server sends to the game client of the invitee specific join information indicating the invitee user to join the online game, such as Room ID, Table ID and Seat ID, and the game client of the invitee adds the invitee user to the online game according to the specific join information sent by the game server; therefore, the inviter user invites the invitee user to join the online game for entertainment together successfully.

In another manner, the game server sends to the inviter the specific join information indicating the invitee user to join the online game, the specific join information containing Room ID, Table ID and Seat ID and so on; the IM client of the inviter generates and sends a second instant message to the IM client of the invitee, wherein the second instant message contains the specific join information sent by the game server to indicate the invitee user to join the online game; the IM client of the invitee parses the second instant message to obtain the join information contained therein, and sends the obtained join information to the game client of the invitee. The game client of the invitee adds the invitee user to the online game provided by the game server according to the received join information. Thereby, the inviter user invites an invitee user to join an online game for entertainment together successfully. Similarly, the IM client of the inviter may send the second instant message to the IM client of the invitee by way of P2P or UDP, or alternatively to the messenger server and the messenger server processes and forwards the second instant message to the inviter.

Subsequently, after successfully adding the invitee user to the online game, the game server may further send to the game client of the invitee a notification message indicating that the invitee user joins the online game successful, and the game client of the invitee may parse the notification message sent by the game server and display the parsed notification message to the invitee user.

In the above description, the game client of the inviter and that of the invitee respectively refer to game clients containing game logic control entities (such as the so called game lobby).

Besides the method provided by the above embodiment of the present invention, an embodiment of the present invention further provides a user apparatus of an inviter and a user apparatus of an invitee.

Figure 3:
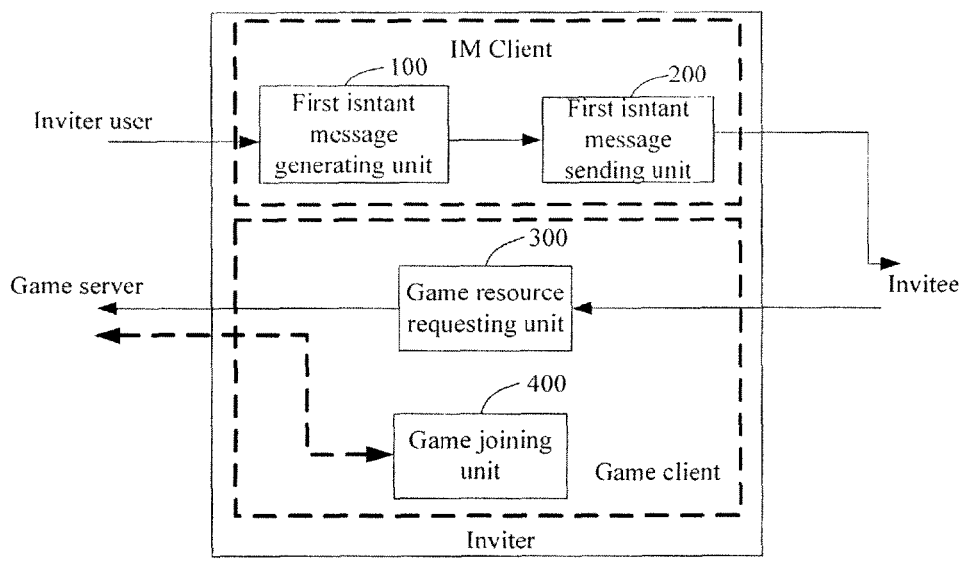
FIG. 3 is a block diagram illustrating a main structure of a user apparatus of an inviter in accordance with Embodiment 2 of the present invention.

FIG. 3 is a block diagram illustrating a main structure of a user apparatus of an inviter in accordance with Embodiment 2 of the present invention. With reference to FIG. 3, the user apparatus mainly includes an IM client and a game client. The IM client is configured to generate a first instant message according to an online game selected by an inviter user and send the first instant message to an invitee. The first instant message contains description information describing the online game selected by the inviter user. The game client is mainly configured to, after the user apparatus of the inviter receives an instant confirmation message indicating that the invitee user agrees to join the online game selected by the inviter user, request the game server providing the online game to allocate game resources according to the description information of the online game selected by the inviter user, and to add the inviter user to the online game after the game resources are successfully allocated.

The IM client may include a first instant message generating unit 100 and a first instant message sending unit 200.

The first instant message generating unit 100 is configured to generate the first instant message according to the online game selected by the inviter user. The first instant message includes description information for describing the online game selected by the inviter user, and the online game is the one that the inviter user intends to initiate and which the inviter and the invitee join together. The description information for describing the online game included in the first instant message may be identity information of the online game, i.e. Game ID information.

The first instant message sending unit 200 is configured to send to the invitee the first instant message generated by the first instant message generating unit 100. Preferably, the first instant message sending unit 200 sends the first instant message to the user apparatus of the invitee by way of P2P or UDP, or alternatively to the messenger server and the messenger server then processes and forwards the first instant message to the user apparatus of the invitee.

The game client may include: a game resource requesting unit 300 and a game joining unit 400.

The game resource requesting unit 300 is configured to, after receiving an instant confirmation message returned by the invitee to indicate that the invitee user agrees to join the online game selected by the inviter user, request the game server at the network-side providing the online game according to the description information of the online game (such as the Game ID information) selected by the inviter user to allocate game resources. The game resource requesting unit 300 may select, according to the Game ID information selected by the inviter user, a game server with the least online clients from those game servers providing the online game. Or a selection strategy may be configured in advance, for example, the ID of the game server to be selected is configured; a corresponding game server is selected according to the selection strategy from those game servers providing the online game, and then the game resource requesting unit 300 requests the game server to allocate the game resources.

The game joining unit 400 is configured to add the inviter user to the online game after the corresponding game server successfully allocates the game resources. The game joining unit 400 may add the inviter user to the online game according to relevant information of joining the selected online game that is preset by the inviter user, such as Room ID, Table ID and Seat ID. Besides, the game joining unit 400 may further include the following components including a receiving subunit and a joining subunit, which fullfil the operation of adding the inviter user to the initiated online game.

The receiving subunit is configured to receive the specific join information indicating the inviter user to join the online game. The specific join information is sent by the game server at the network-side to the inviter after the game server at the network-side has successfully allocated the game resources, and the specific join information indicating the inviter user to join the online game sent by the game server may include Room ID, Table ID and Seat ID.

The joining subunit is configured to add the inviter user to the online game provided by the corresponding game server according to the specific join information received by the receiving subunit.

Figure 4:
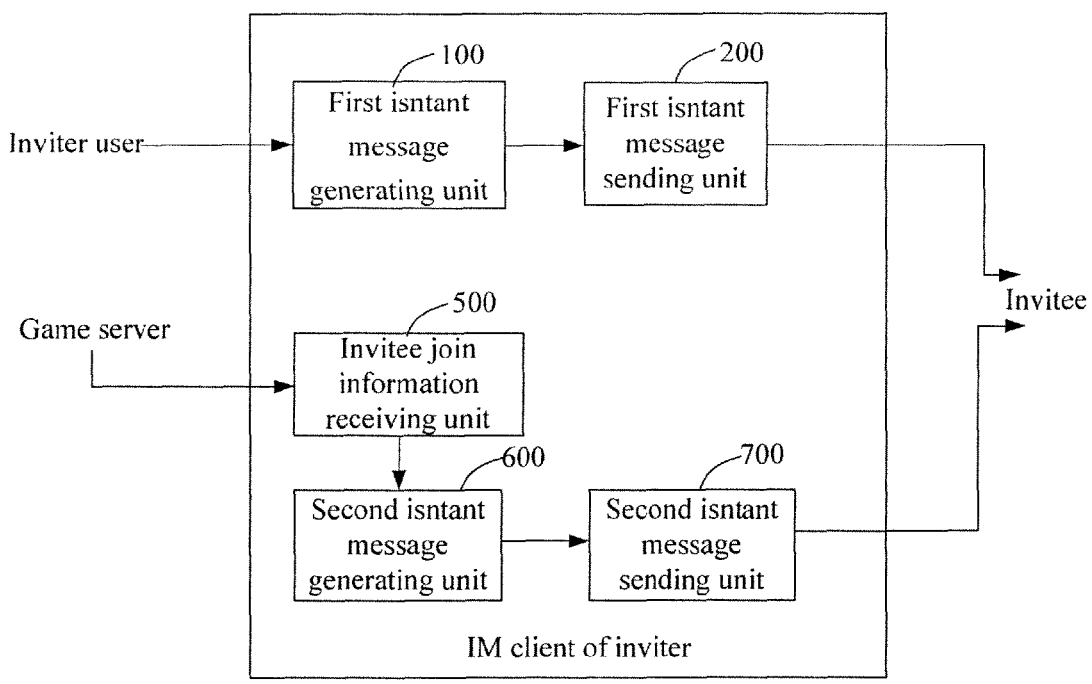
FIG. 4 is a block diagram illustrating a structure of an IM client in the user apparatus of the inviter in Embodiment 3 of the present invention.

FIG. 4 is a block diagram illustrating a structure of an IM client in a user apparatus of an inviter in Embodiment 3 of the present invention. With reference to FIG. 4, besides the components shown in FIG. 3, the IM client further includes an invitee join information receiving unit 500, a second instant message generating unit 600 and a second instant message sending unit 700, and specific functions of each newly added unit are described below.

The invitee join information receiving unit 500 is configured to receive the specific join information indicating the invitee user to join the online game. The specific join information is sent to the inviter by the game server providing the online game, and the specific join information indicating the invitee user to join the online game includes information such as Room ID, Table ID and Seat ID.

The second instant message generating unit 600 is configured to generate the second instant message. The second instant message includes the above-mentioned specific join information indicating the invitee user to join the online game and received by the invitee join information receiving unit 500.

The second instant message sending unit 700 is configured to send the second instant message generated by the second instant message generating unit 600 to the invitee. Preferably, the second instant message sending unit 700 may directly send the generated second instant message to the apparatus in which the invitee user is located by way of P2P or UDP, or alternatively to the messenger server and the messenger server then processes and forwards the second instant message to the apparatus in which the invitee user is located.

Figure 5:
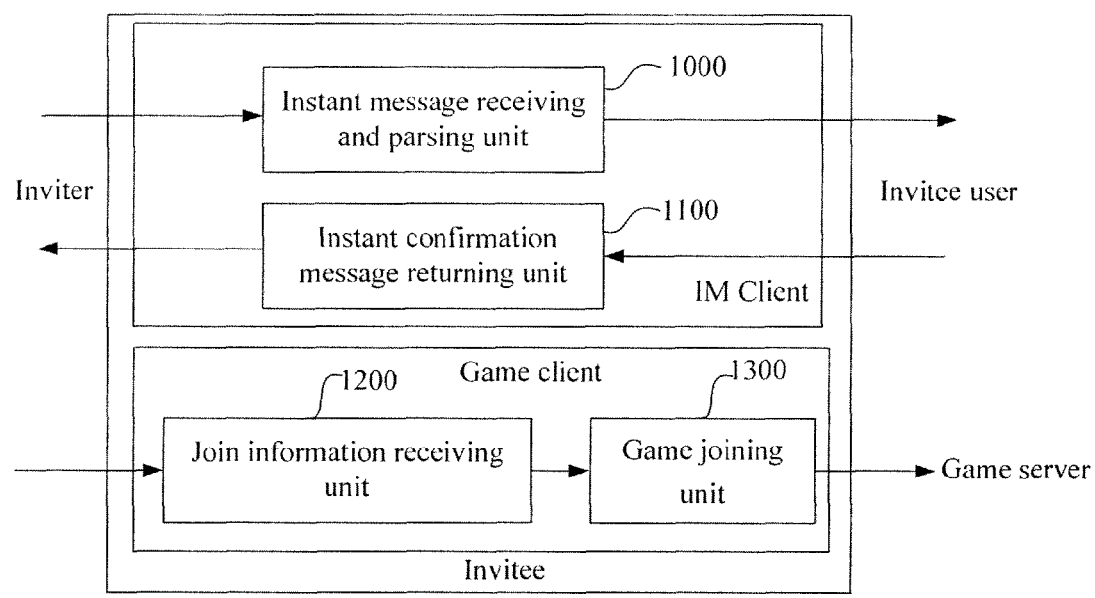
FIG. 5 is a block diagram illustrating a main structure of a user apparatus of an invitee in accordance with Embodiment 4 of the present invention.

FIG. 5, which is a block diagram illustrating a main structure of a user apparatus of an invitee in accordance with Embodiment 4 of the present invention. With reference to FIG. 5, the user apparatus mainly includes an IM client and a game client. The IM client is configured to parse the description information of the online game included in the first instant message sent by the inviter and to display the description information to the invitee user. Further, the IM client is configured to, after the invitee user agrees to join the online game, generate an instant confirmation message and send the instant confirmation message to the inviter. The game client is configured to receive the join information indicating the invitee user to join the online game provided by a corresponding game server, and to add the invitee user to the online game according to the received join information. The IM client specifically includes an instant message receiving and parsing unit 1000 and an instant confirmation message returning unit 1100.

The instant message receiving and parsing unit 1000 is configured to receive the first instant message sent by the inviter, and to parse the description information of the online game included in the first instant message and display the description information to the invitee user.

The instant confirmation message returning unit 1100 is configured to generate the instant confirmation message and return the instant confirmation message to the inviter after the invitee user agrees to join the online game. The instant confirmation message returning unit 1100 may send the generated instant confirmation message directly to the inviter by way of P2P or UDP, or alternatively to the messenger server and the messenger server then processes and forwards the instant confirmation message to the inviter.

This game client specifically includes a join information receiving unit 1200 and a game joining unit 1300.

The join information receiving unit 1200 is configured to receive the specific join information indicating the invitee user to join the online game provided by the corresponding game server. The join information receiving unit 1200 may receive the join information indicating the invitee user to join the online game from the game server providing the online game; or the join information receiving unit 1200 may receive the second instant message sent by the inviter, wherein the second instant message includes the specific join information indicating the invitee user to join a corresponding online game. The join information received by the join information receiving unit 1200 for indicating the invitee user to join the corresponding online game specifically includes Room ID, Table ID and Seat ID.

The game joining unit 1300 is configured to add the invitee user to the online game provided by the corresponding game server according to the specific join information received by the join information receiving unit 1200. And thus the inviter user can successfully invite an invitee user to join an online game for entertainment together.

Figure 6:
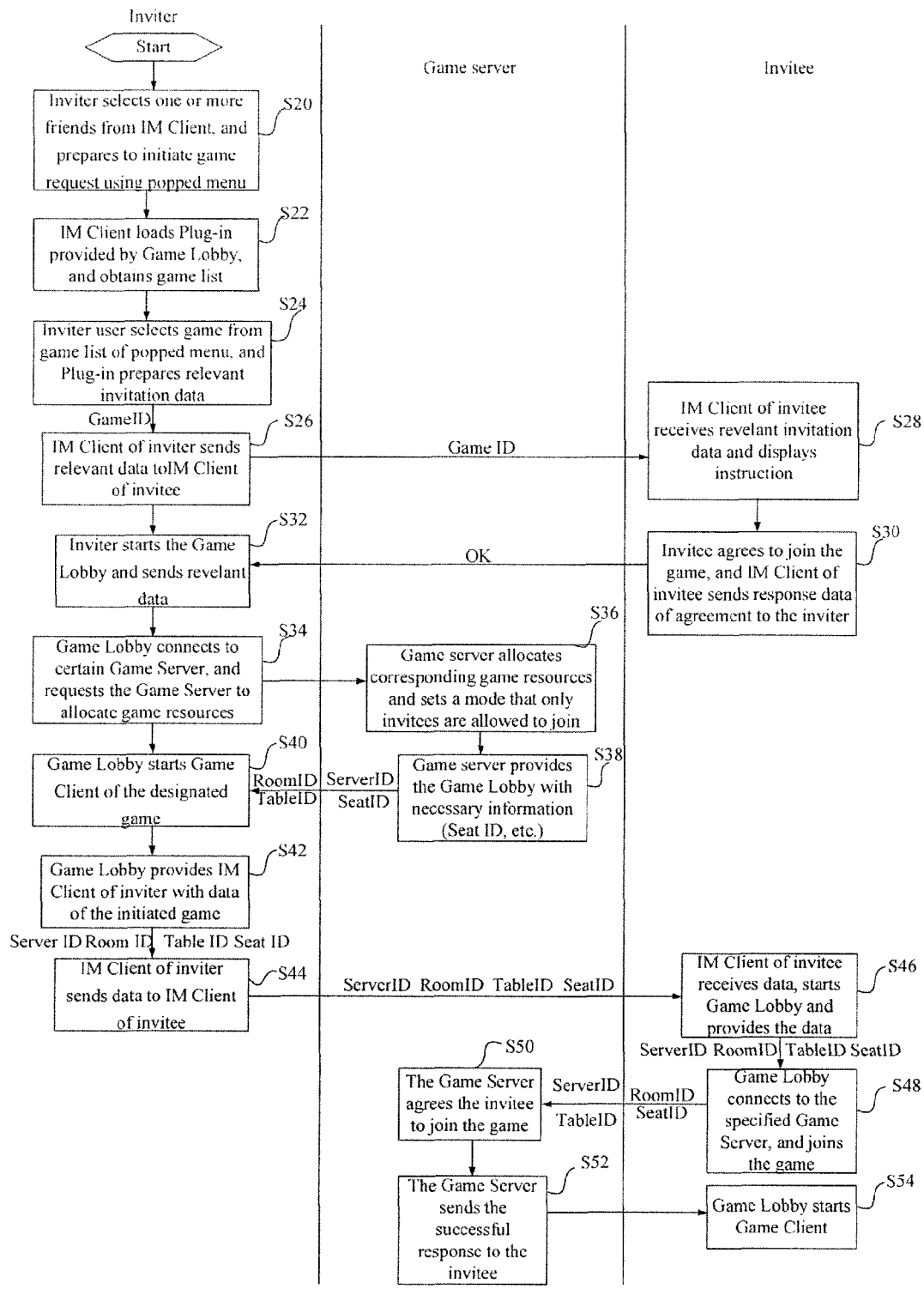
FIG. 6 is a flowchart illustrating a method for joining an online game in accordance with Embodiment 5 of the present invention.

Referring to the solution principle described above by the present invention, an embodiment of the present invention is provided to describe the whole procedure from the inviter user initiating a request for playing a game to the inviter user and the invitee user playing the game together. With reference to FIG. 6, which shows the specific implementing procedure of Embodiment 5 of the present invention. The whole procedure may be divided into such three processes: a game inviting process, a game joining process of an inviter and a game joining process of an invitee.

The game inviting process specifically includes:

S20: The inviter user selects one or multiple friends from a friend list provided by the IM client, and prepares to invite the selected friend(s) to join a game through a menu popped out by the IM client.

S22: Before popping out a menu, the 1M client loads a game lobby. The game lobby is configured to provide common functions irrelevant to specific game logics, such as connecting a game server and initiating a game, and is a software program in a user apparatus, e.g. a functional component of the game client. The loaded game lobby provides a Plug-in, which is an independent component configured to provide some functional interfaces which can be loaded by the IM client and to provide game relevant information for the IM client. Through the Plug-in, the game list may be provided and displayed to the inviter user.

S24: The inviter user selects a game which the inviter user desires to play with others from the online game list shown in the popped menu. The plug-in provided by the game lobby prepares relevant invitation data according to the game selected by the inviter user, wherein the relevant invitation data prepared includes Game ID and Game ID helps the game lobby decide which game to initiate S26: The IM client of the inviter user converts the relevant invitation data prepared by the plug-in to an instant message, and sends the instant message directly to the IM client of the invitee user by way of a certain network transmission manner (including but not limited to P2P and UDP, and which manner will be used depends on the network connection manner selected by the IM client when started up). The above sending process may be finished without the forwarding of the messenger server.

S28: The IM client of the invitee user parses and displays the relevant invitation message sent by the IM client of the inviter user. The relevant invitation message includes operable contents such as agreeing with the invitation or cancelling the invitation.

S30: If the invitee user agrees to join the game, the IM client of the invitee user returns to the IM client of the inviter user the response data indicating that the invitee user agrees.

The IM client of the invitee user may return the response data indicating that the invitee user agrees also by way of P2P and UDP without the forwarding of the messenger server. Thereby, the IM client of the inviter user can join the game subsequently after receiving from the IM client of the invitee user the response data indicating that the invitee user agrees to join the game.

The game joining process of the inviter includes:

S32: After receiving the response data indicating that invitee user agrees to join the game, the IM client of the inviter user starts the game lobby at the inviter user side, and sends to the game lobby the relevant information (which is mainly the Game IDs of the initiated invitation) of the game selected by the inviter user.

S34: After the game lobby is started, according to a retrieved game server list, the IM client of the inviter user selects a game server from the game servers corresponding to the above-mentioned Game IDs according to a certain strategy (such as selecting a game server randomly or the one with less clients), connects to the selected game server directly and automatically, and requests the game server to allocate game resources for the corresponding game.

S36: The game server allocates the game resources for the game. In order to prevent irrelevant persons from joining the game before the invitee user, which may make the invitee user unable to join the game, the game server may require the game lobby at the invitee user side to report relevant attribute information such as an invitation identity, an invitee identity and password, and thereby the game server can guarantee that players other than the invitee user cannot join the game.

S38: The game server adds the inviter user to the game, and provides the inviter user with join information which is needed for the invitee user to join the game, wherein the join information mainly includes Server ID, Room ID, Table ID and Seat ID.

In this process, the inviter user may preset the join information, for example, preset Table ID and Seat ID, and report the join information such as Table ID and Seat ID to the game server providing the game so as to join the game initiated by the game server directly.

S40: After receiving the specific join information which is returned by the game server and is configured to indicate the invitee user to join the online game, the game lobby of the inviter user starts the game client corresponding to the game. At this point, the inviter user successfully joins the corresponding online game.

The game joining process of the invitee includes:

S42: After the game client of the inviter user is started, the game lobby of the inviter communicates with the IM client of the inviter user, notifies the IM client of the inviter user that the game client of the inviter user is ready, and provide relevant join information (including game server ID, Game Room ID, Game ID, Table ID and Seat ID) indicating the invitee user to join the game to the IM client of the inviter user.

S44: After receiving the join information, the IM client of the inviter user sends to the IM client of the invitee user the join information in the form of an instant message in a certain network communication manner (including but not limited to P2P and UDP).

S46: After receiving the join information, the IM client of the invitee user starts the game lobby of the invitee user, and delivers the join information to the game lobby of the invitee user.

S48: According to the received join information, the game lobby of the invitee user connects to the same game server to which the inviter user is connected, and joins the game initiated by the game server.

S50: The game server arranges the invitee user to join the game initiated by the inviter user.

S52: The game server sends a response message of success to the game lobby of the invitee user.

S54: The game lobby of the invitee user starts the corresponding game client of the invitee user and prepares to participate in the game; and the game starts after all invitee users agreeing to join the game.

During the above-described procedures of the embodiment, the IM client of the inviter user and that of the invitee user can communicate instant messages by multiple communication manners, such as UDP, P2P or direct link.

The relevant invitation data sent to the invitee user by the inviter user includes the Game ID so that the invitee user can learn which game is initiated by the inviter user according to the Game ID. The response data indicating that the invitee user agrees or refuses to join the game may be a positive or negative identity.

Alternatively, the invitee user may also join the game without providing the game server with the Seat ID, instead, the game server allocates a vacant seat and returns ID information of the vacant seat to the invitee user.

As can be seen from the above, the technical scheme of the above embodiment does not need the involvement of the messenger server, the IM client of the inviter user and that of the invitee user can communicate data to each other by way of P2P, UDP or the like, so that the messenger server need not waste time upon processing and forwarding such information, and thus the bandwidth and the number of connections of the messenger server are saved.

Besides, the inviter user selects the inviter user pertinently and invites the selected invitee user by way of an instant message, which can effectively save network transmission processing resources.

Meanwhile, when the inviter user and invitee user communicate the invitation information or the join information of joining an online game to each other, the corresponding instant message is transmitted directly by way of P2P or UDP, so that it does not need the processing and forwarding of the messenger server and thus the processing workload of the messenger server caused by forwarding excessive instant messages is reduced.

Moreover, the inviter user just needs to select the game to be initiated and the contacts to be invited, and the user apparatus in which the inviter user is located automatically invites the selected contacts to join the online game. After the selected contacts agree to join the online game, the user apparatus in which the inviter user is located automatically connects to the game server at the network side and adds the inviter user to the corresponding online game, and sends relevant join information to the invitee. The invitee will automatically add the invitee users to the online game according to the received join information. Thereby, both the inviter user and the invitee user can operate conveniently without excessive manual operations, and the user's experience is thus greatly improved.

Meanwhile, the game lobby of the inviter user provides a plug-in, which can list available online games, and thereby the IM client need not update the relevant information of games.

However, the inviter needs to send to the invitee the game information obtained form the game server, so that the invitee can join the current established game according to the received game information. Because the inviter needs to send to the invitee the game information, the complexity of the logic processing of the inviter increases to some extent and the processing load of the inviter also increases. Especially, for a client of which any resources are very limited, such as a mobile terminal, an intensive processing load will greatly affect the service performance of the client. Besides, when there are multiple invitees, the inviter needs to send multiple pieces of game information to each invitee respectively so that each invitee can join the current established game.

In addition, even if the inviter establishes a game, the inviter cannot stop other users except the inviter user from joining the current established game. Therefore, when other users join the game established by the inviter, the invitee user may be unable to join the current game. As a result, the current established game may not proceed normally, and the quality of service of the game is affected enormously.

In a further preferred embodiment of the present invention, the game relevant information may be provided by the game server to all parties participating in the current game; further, each party joins the current established game according to the game relevant information provided by the game server. Herein, because the establishing party requesting to establish the current game need not send the game relevant information for participating in the current game to all the other parties, the load of the establishing party establishing the game reduces to some extent, and technical effect of this embodiment of the present invention becomes prominent especially when there are relatively more participating parties.

Here, the game relevant information described in the embodiment of the present invention is not limited to the ID of the game server providing a game service and the Room ID of a game. Instead, the game relevant information described in the embodiment of the present invention may actually be any information that can index to the game or any information that can route to the game server providing the current game service, such as game redirecting information. The game redirecting information itself does not include the ID of the game server providing a game service or the information of the game room, and all parties can access the game server providing the current game service according to the game redirecting information. Herein, the game server is an entity providing services for specific games.

Figure 7:
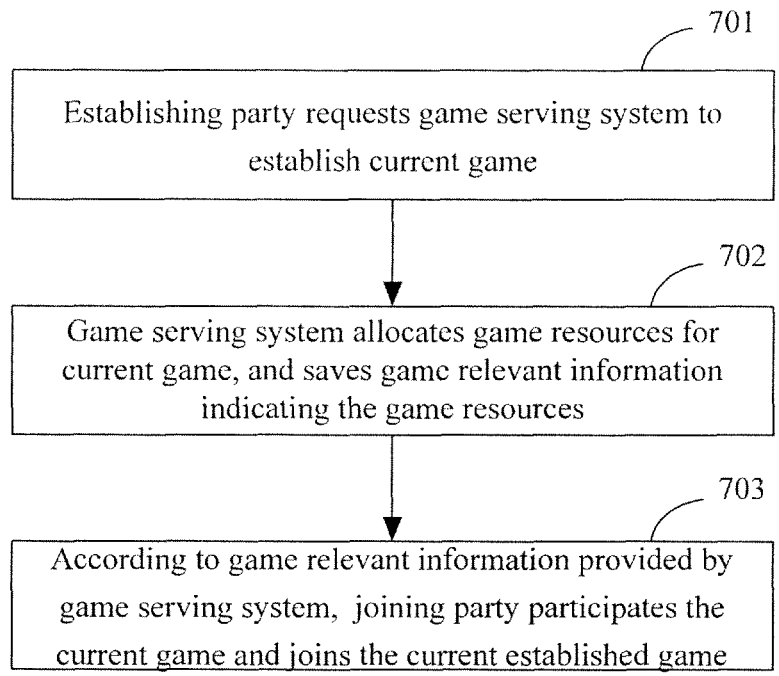
FIG. 7 is a flowchart illustrating a method for joining an online game in accordance with Embodiment 6 of the present invention.

FIG. 7 is a flowchart of a method in accordance with Embodiment 6 of the present invention. With reference to FIG. 7, the method is described below. In Block 701, an establishing party requests a game server to establish a current game. In Block 702, the game server allocates game resources for the current game and stores the game relevant information for indicating the game resources. In Block 703, a joining party participating in the current game joins the current game established according to the game relevant information provided by the game server.

Figure 8:
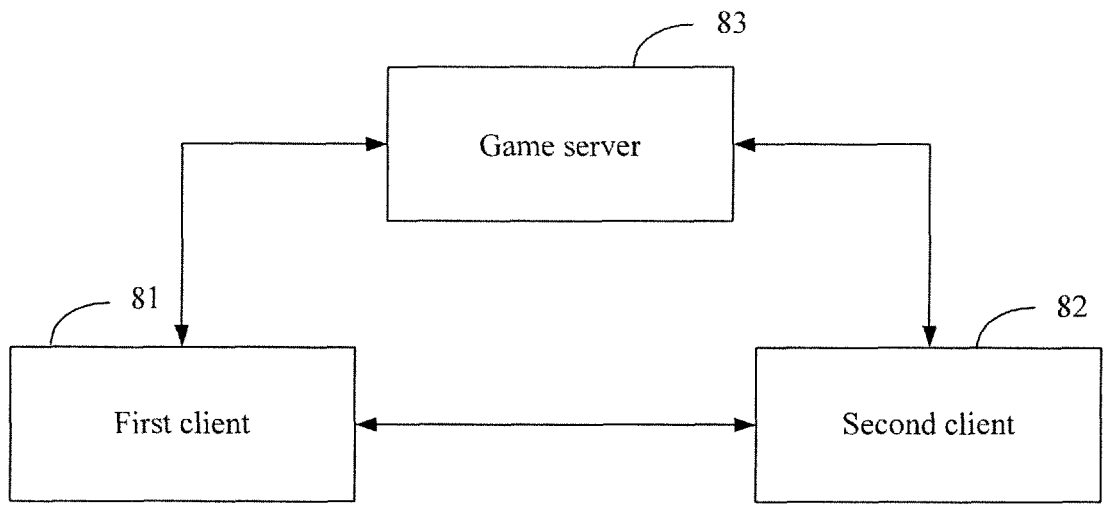
FIG. 8 is a schematic diagram illustrating a structure of a system for implementing the method for joining the game in Embodiment 7 of the present invention.

FIG. 8 is a schematic diagram illustrating a structure of a system in accordance with Embodiment 7 of the present invention. With reference to FIG. 8, the system includes: a first client 81, a second client 82 and a game server 83 (also called a game serving system in some cases). The first client 81 sends to the game server 83 a request for establishing a current game, receives game relevant information sent by the game server 83, aid adds a user of the first client 81 to the current game according to the game relevant information. The second client 82 receives the game relevant information sent by the game server 83, and adds a user of the second client 82 to the current game according to the game relevant information. The game server 83 receives the request for establishing the current game from the first client 81, allocates game resources for the current game and stores the game relevant information for indicating the game resources, and sends the game relevant information to the first client 81 and the second client 82. Herein, according to the process illustrated in FIG.

7 and the structure illustrated in FIG. 8, it is obvious that the first client 81 represents the establishing party, while the second client 82 represents the participating parties (except the establishing party) which need to join the game.

Herein, according to different specific implementation details, the joining party may be all the parties participating in the current game including the establishing party; or the joining party may be all the parties except the current establishing party. Examples will be taken to introduce these two types of technical schemes in detail hereinafter. The first preferred embodiment describes the situation in which the joining party corresponds to all parties except the establishing party; the second preferred embodiment describes the situation in which the joining party corresponds to all parties participating in the current game.

In addition, in the technical scheme of the present invention, the parties participating in the current game may be the IM client and the game client which are used by users of the parties participating in the current game. The IM client and the game client may be in an apparatus entity such as a personal computer, a portable laptop or a mobile terminal with an access to the internet.

Figure 9:
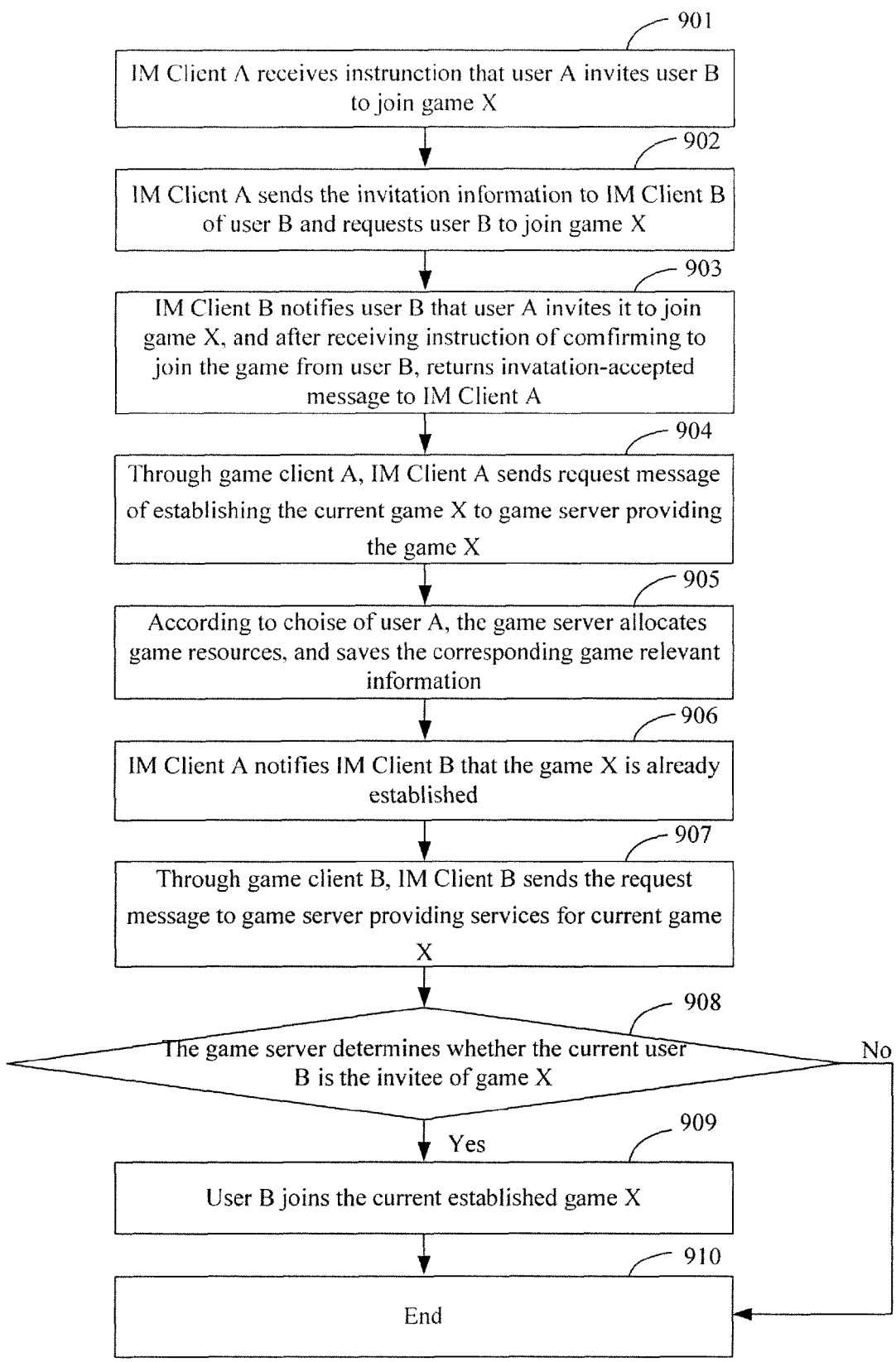
FIG. 9 is a flowchart illustrating a method for joining an online game in accordance with Embodiment 8 of the present invention.

FIG. 9 is a flowchart illustrating a method in accordance with Embodiment 8 of the present invention. With reference to FIG. 9, in the technical scheme of Embodiment 8, an inviter is the establishing party, and the establishing party joins a current game during the process of establishing the current game; an invitee is the joining party, and, after the establishing party establishes the current game, the joining party joins the current game by obtaining game relevant information from the game server. Specific procedure is described below.

In Block 901, an IM client A receives an instruction that a user A invites a user B to join a game X. The participating party at which the user A is located is the inviter corresponding to the establishing party; while the participating party at which the user B is located is the invitee corresponding to the joining party.

Herein, the user A may send the instruction to its IM client A by way of: a game option is added to the right-click friend menu of the IM client A, and the game option links to a game list. The user A selects a user to join the game together from the friend list first, and the selected user is the user B as assumed in the embodiment of the present invention. The IM client A confirms the instruction of the user A according to a specific choice of the user A. Herein, the game list may be the game list maintained by the game client A used by the user A. In the embodiment of the present invention, the IM client A can link to the game list through a plug-in.

In Block 902, the IM client A sends, to the IM client B in which the user B is located, an invitation message of inviting the user B to join the game X, and the invitation information includes a game identity of the game X.

Certainly, in the embodiment of the present invention, the user A may also send to multiple invitee users the invitation messages of invite the multiple invitee users to joint the game X through Blocks 901~902. Herein, the multiple invitee users all belong to the joining party.

In Block 903, after receiving the invitation message sent by the IM client A, the IM client B indicates the user B that the user A invites it to join the game X; after receiving an instruction of agreeing to join the game from the user B, the IM client B returns to the IM client A an invitation-accepted message.

In Block 904, after receiving the invitation-accepted message from the IM client B, the IM client A starts the game client A corresponding to the user A, and sends to the game server providing the game X an establishment request message to request establishing the game X, wherein the establishment request message includes an identity of an invitee user.

In the embodiment, the identity of the invitee user is the identity of the user B. In addition, it can be concluded that, the participating party at which the user A is located is the establishing party described in FIG. 7 because the user A requests the game server to establish the game X.

In this Block, if the user A invites multiple users currently, the establishment request message contains identities of the multiple users. In the case that all users participating in the current game X join the current game X through the IM client, the identity described in the Block may be but not limited to the instant messaging number of a user used during the instant messaging process, and the identity may be any identity of the user that can uniquely represent the user.

In Block 905, the game server allocates game resources for the current game X according to the choice of the user A, stores the game relevant information for indicating the game resource, and records the identity of the invitee participating in the current game X, which is the identity of the user B in the embodiment.

Recording identity of the invitee participating in the current game X is similar to configuring the requirement for joining the current game X. Only when the identity of a user is recorded, can the user with the identity obtain the game relevant information provided by the game server.

The game resources include information such as the identity of the game server providing services for the current game X and the game room ID. Thereby, allocating the game resources according to the choice of the user A is that: the game server determines the resources currently allocated to the game X according to the choice of the user A in the game lobby. The specific implementation of the allocation is common prior art, and is not to be described in detail herein. Because the game server allocates corresponding game resources to the current game during the process of the user A joining the current game, the user A has already obtained the game relevant information and has been in the established game X. Therefore, in the subsequent process of the embodiment of the present invention, the game server need not provide the game relevant information for the user A any more, and thus the establishing party in the embodiment is not included in the joining party mentioned below.

In Block 906, after the game X is established, the IM client A learns through the game client A that the current game X is already established, and indicates the IM client B that the game X is already established.

In Block 907, after receiving the instruction sent by the IM client A, the IM client B sends, through the game client B, a join request message of joining the current established game X to the game server providing services for the current game X, wherein the join request message contains the identity of the user B.

The IM client B may obtain the address of the game server providing services for the current game X by the following ways. One is that: the IM client B records the game identity of the game X contained in the invitation message in Block 903 and the IM client A sends the recorded game identity to the game client B when the IM client A has sent the instruction that the game X is established already; according to the game identity, the game client B sends a join request message to the game server providing corresponding game services. The other is that: when the IM client A sends to the IM client B the instruction that the game X is established already, the instruction may further contain the address of the game server that establishes the current game X; the IM client B provides the received address of the game server for the game client B so that the game client B can access the game server. The IM client A may obtain the address of the current game server from the game client A.

In Block 908, after receiving the join request message sent by the IM client B, the game server obtains the identity of the user B contained in the join request message and. Further, the game server determines, according to the identity of the invitee participating in the game X recorded in Block 905, whether the user B is the invitee of the game X; if the user B is the invitee of the game X, Block 909 is performed, otherwise, Block 910 is performed.

The process of determining whether the user B is the invitee of the game X is equivalent to the process of determining whether the user B is qualified to join the current game X. If the user B is qualified, the game server sends the corresponding game relevant information to the game client B in which the user B is located; otherwise, the party of the user B cannot obtain the game relevant information, and thus can not join the current game X.

In Block 909, the game server sends the stored game relevant information of the game X to the user B; the user B starts the corresponding game client B, and joins the current established game X by using the received game relevant information. The user A and the user B can thus start to play the game together. The current process is terminated.

In Block 910, the current process is terminated. The game server refuses to send the stored game relevant information of the game X to the user B, and as a result, the user can not join the current established game X.

Figure 10:
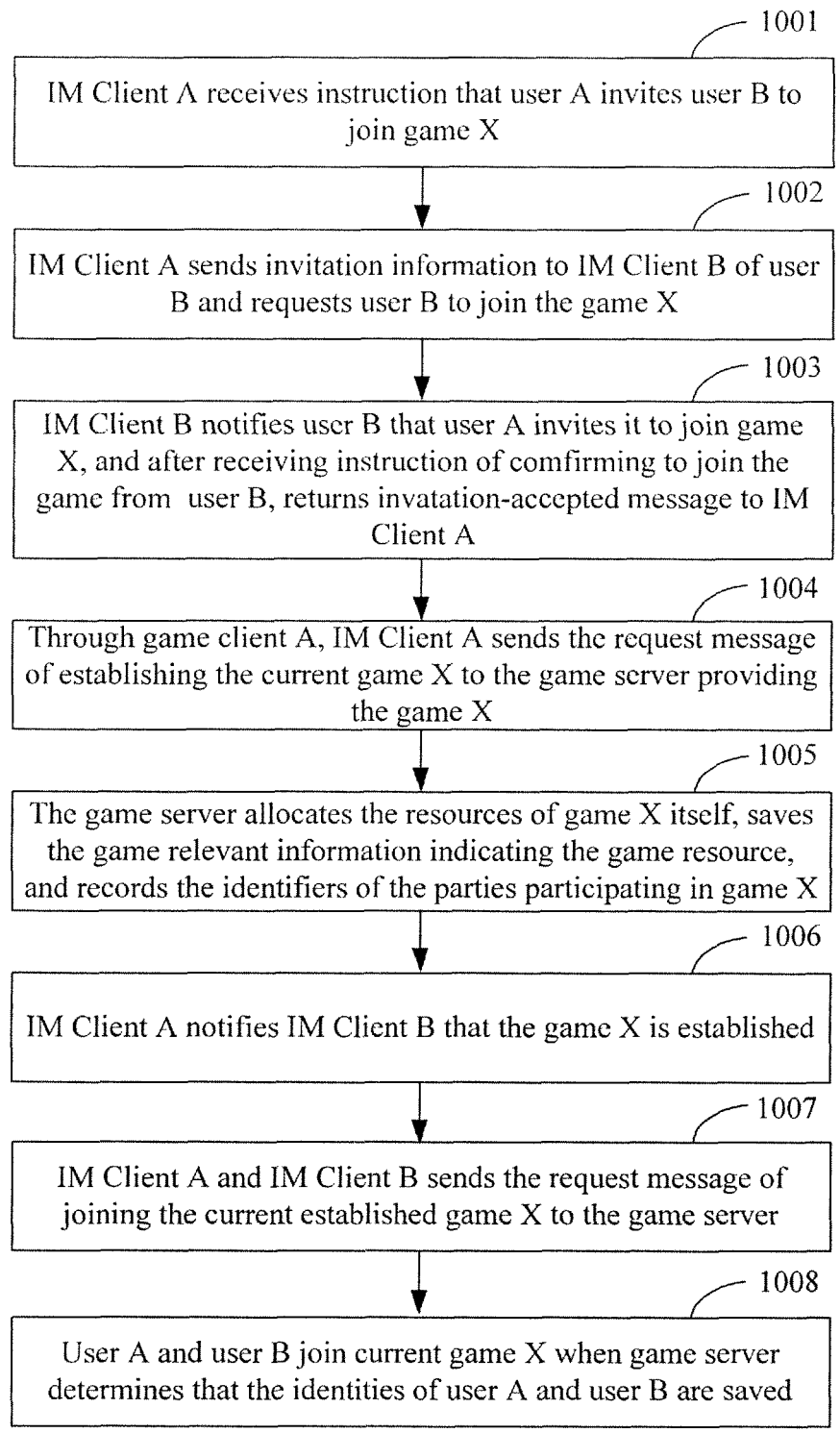
FIG. 10 is a flowchart illustrating a method for joining an online game in accordance with Embodiment 9 of the present invention.

FIG. 10 is a flowchart illustrating a method in accordance with Embodiment 9 of the present invention. With reference to FIG. 10, in the technical scheme of Embodiment 9, the inviter is also the establishing party, while the establishing party only requests establishing the current game but does not join the game during the process of the game server establishing the current game; the joining party includes the invitee and the inviter (i.e. the establishing party in this embodiment). After the game server is established the current game, both the invitee and the inviter join the current game through obtaining the game relevant information from the game server. The specific procedure is described below.

Blocks 1001~1004 are similar to Blocks 901~904 in the Embodiment 8 above, and will not to be described again.

In Block 1005, the game server automatically allocates game resources for the game X according to the game X which the user A requests establishing, stores game relevant information indicating the game resources, and records identities of participating parties that participate in the current game X, i.e. the identities of the user A and the user B.

The game resources in this embodiment mean the same as those in the Embodiment 8 above, which will not to be described again. The game server automatically allocates the game resources for the current game X through the following process: the game server allocates, according to the current available resources of the game server, the game resources for the game X randomly or according to certain settings. That the game server allocates the game resources automatically achieves the advantage that the game server can effectively control the game initiated currently.

In addition, because the game server allocates the game resources for the game X automatically rather than according to a choice of the user A, the user A does not join the game X before the game server sends the game relevant information to user A, which is different from Embodiment 8 the user A joins the game X as soon as the game server establishes the game X. Therefore, what is different from the Embodiment 1 is that the game server records not only the identity of the invitee but also the identity of the inviter, i.e. records the identities of the participating parties that participate in the current game X as described in Block 1005. Because the user A does not obtain the game relevant information from the game server during the process of establishing the game but has to obtain the game relevant information of the current game as other participating parties by sending to the game server a join request message of joining the game, the establishing party in this embodiment is included in the joining party.

In Block 1006, after the game X is established, the IM client A learns through the game client A that the current game X is established already, and indicates the IM client B that the game X is established already.

In Block 1007, through corresponding game clients respectively, the IM client A and the IM client B send join request messages of joining the current established game X respectively to the game server providing services for the current game X; wherein the join request messages contain the identities of the user A and the user B respectively.

In Block 1008, according to the technical scheme of Block 908 in Embodiment 8, the game server checks the identity of the user A and the identity of the user B respectively; after determining that the user A is the participating party of the current game X, the game server sends the game relevant information to the user A; after determining that the user B is the participating party of the current game X, the game server sends the game relevant information to the user B. After receiving the game relevant information, the user A and the user B can join the current established game X trough corresponding game clients respectively, and start to play the game together.

As can be seen from the above two preferred embodiments of the present invention that, the above descriptions are mainly for the situation in which the establishing party corresponds to the inviter. However, the technical scheme of the embodiments of the present invention is also applicable to the situation in which the establishing party corresponds to the invitee. If the establishing party is the invitee of the current game, the establishing party starts the operation of requesting the game server to establish the current game after receiving the request of joining the game sent by the inviter of the game. Subsequently, the implementation of the invitee establishing the current game and the inviter joining the current game is similar to that recorded in the technical schemes of Embodiment 8 and Embodiment 9 of the present invention, which will not to be described again.

Besides, the technical schemes described in Embodiment 8 and Embodiment 9 is mainly for the situation in which there is only one invitee user, while the technical schemes of the present invention are also applicable to the situation in which there is more than one invitee user. When there is more than one invitee user, the operation of the inviter for each invitee, the operation of the game server for each invitee, and the operation of the invitee itself are all similar to the operations for the invitee user B described in Embodiment 8 and Embodiment 9, and the specific details will not to be described herein.

Figure 11:
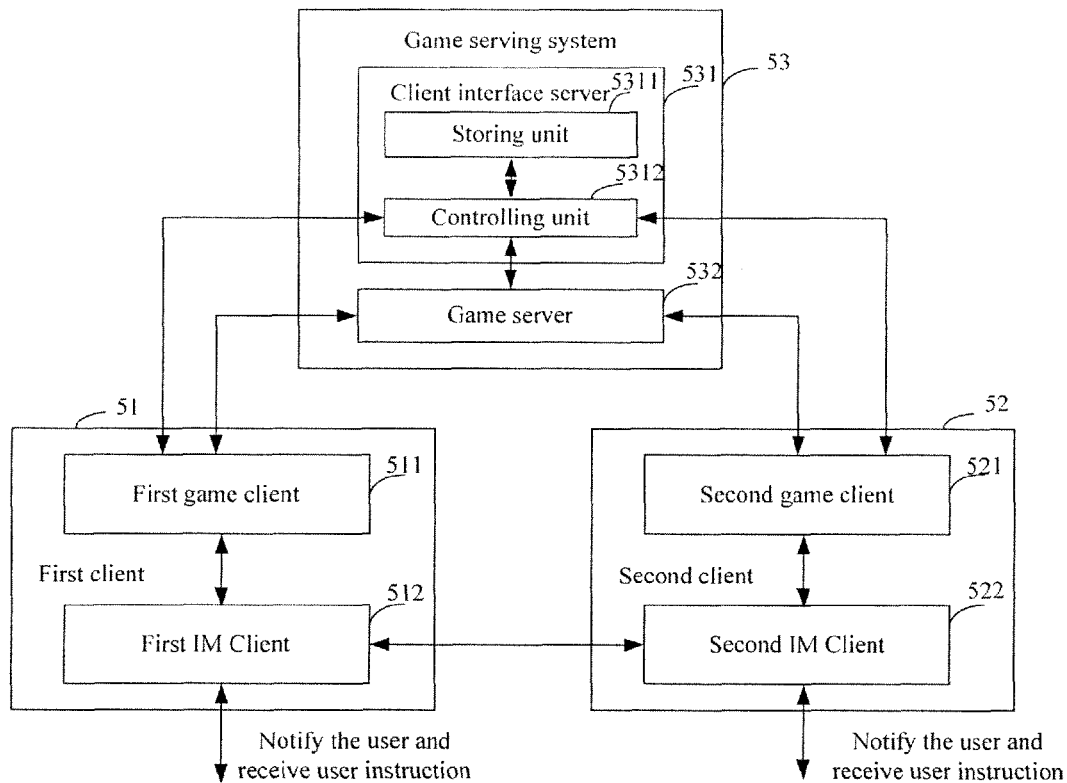
FIG. 11 is a schematic diagram illustrating a structure of a system in accordance with Embodiment 10 of the present invention.

Another aspect of the embodiment of the present invention will be introduced hereinafter. FIG. 11 is a diagram illustrating a structure of a system for participating in a game in accordance with Embodiment 10 of the present invention. The structure of the system is applicable to the methods in Embodiment 8 and Embodiment 9. With reference to FIG. 11, the system includes: a first client 51, a second client 52 and a game server 53 (also called a game serving system 53 as in FIG. 11).

Besides the structure and connection relations of the first client 51, the second client 52 and the game server 53 shown in FIG. 8, the second client 52 further sends a request of joining the game to the game server 53. After allocating the game resources for the current game, the game server 53 further configures requirements for joining the current game, receives the request sent by the second client 52, and sends game relevant information stored in the game server 53 to the second client 52 after determining that the second client 52 is qualified to join the current game.

In addition, after storing the game relevant information and configuring the requirements, the game server 53 further indicates the first client 51 that the current game is already established. The first client 51 further indicates the second client 52 that the current game is already established. After receiving the instruction sent by the first client 51, the second client 52 requests the game server 53 to join the current game.

The first client 51 may include a first IM client 512 and a first game client 511 specifically. The first IM client 512 indicates the first game client 511 to establish the current game; receives the instruction sent by the first game client 511 that the current game is already established; and indicates the second IM client 522 that the current game is established. The first game client 511 receives the instruction of establishing the current game sent by the first IM client 512, and sends a request of establishing the current game to the game server 53; receives the game relevant information sent by the game server 53, and adds the first client 51 to the current game according to the game relevant information; indicates the first IM client 512 that the current game is already established.

The second client 52 may include a second IM client 522 and a second game client 521 specifically. The second IM client 522 receives the instruction sent by the first client 51 that the current game is already established, and indicates the second game client 521 to establish the current game. The second game client 521 receives the instruction sent by the second IM client 522, and sends a request of joining the current game to the game server 53; receives the game relevant information sent by the game server 53, and adds the second client 52 to the current game according to the game relevant information.

The first IM client 512 and the second IM client 522 are further configured to interact with a user, to receive an instruction of the user and notify the user of relevant information.

Similarly, while requesting the game server 53 to establish the current game, the first game client 511 further sends the identity of the second IM client 522 participating in the current game to the game server 53. The game server 53 records the identity received, and determines whether the identity of the second IM client 522 is recorded already; if the identity of the second IM client 522 is recorded already, the game server 53 determines that the second IM client 522 is qualified.

Specifically, the game server 53 may include a client interface server 531 and a game server 532. There may be one or more game servers 532, and the client interface server 531 may be a game lobby server. The client interface server 531 receives the request of establishing the current game from the establishing party, assigns the game server 532 to provide services for the current game, and stores the game relevant information that indicates the game resources provided by the game server 532; and sends the game relevant information to the participating parties which participate in the current game, including the establishing party. The game server 532 receives the game relevant information corresponding to itself and provides current game services for the participating party sending the game relevant information. With reference to FIG. 11, in the description of this paragraph and the next paragraph, the establishing party corresponds to the first client 51, while the joining party includes the first client 51 and the second client 52.

Specifically, the client interface server 531 specifically includes: a controlling unit 5312 and a storing unit 5311. The controlling unit 5312 receives the request of establishing the current game from the establishing party, and assigns the game server 532 to provide services for the current game; stores the game relevant information corresponding to the game server 532 in the storing unit 5311, configures the requirements for joining the current game and stores the requirements in the storing unit 5311. The controlling unit 5312 performs the operation of sending the game relevant information to the establishing party during the process of the establishing party joining the current game. Further, while assigning the game server 532 to provide the game services for the current game and receiving the request of joining the current game sent by the establishing party, the controlling unit 5312 sends the game relevant information to the establishing party if the current participating party is qualified to join the current game. The controlling unit further receives the request of joining the current game sent by the participating parties participating in the current game other than the establishing party, sends the stored game relevant information to the participating parties after determining that the participating parties are qualified to join the current game. The storing unit 5311 stores the game relevant information and the requirements for joining the current game.

To sum up, in technical scheme of the present invention, the game relevant information is sent through the game server to all participating parties which are to participate in the game, and each participating party joins the current established game according to the game relevant information provided by the game server. In the technical scheme of the present invention, because the establishing party requesting to establish the current game need not send the game relevant information to all the other participating parties, the processing load of the establishing party decreases to some extent, especially when there are relatively more participating parties. Moreover, because the requirements for participating in the current game are further configured in technical scheme of the present invention, it is guaranteed that only the qualified participating parties can join the current game. Meanwhile, the successful proceeding of the current game is further guaranteed and the quality of service for the user is improved.

In the above description, it is the inviter that establishes the game which the parties join together, while the invitee can join the game established by the inviter only after the game is already established. Therefore, the invitee has no initiative of establishing the game, and thus can not choose the game resources of the game that the invitee participates in. The game resources include resources such as the game server providing services for the current game and the game room. Further, although the invitee can decide whether the game request is successful or whether the inviter can join a game together with the invitee, the invitee cannot determine other information related to the game, such as the game server providing services or the environment of the game that the invitee participates in. Therefore, the technical scheme still can not change the situation that the invitee imitatively accept a game and passively join the game, and thus cannot satisfy the invitee user.

Another preferred embodiment of the present invention provides a solution for the above situation. In the solution, it is the invitee that establishes the game to join together with the inviter, so that the invitee has the initiative of establishing a game, and the invitee can thus not only decide whether to join the game, but also choose the relevant information of the game to join, such as the game resources. Therefore, the invitee user can be better satisfied.

Figure 12:
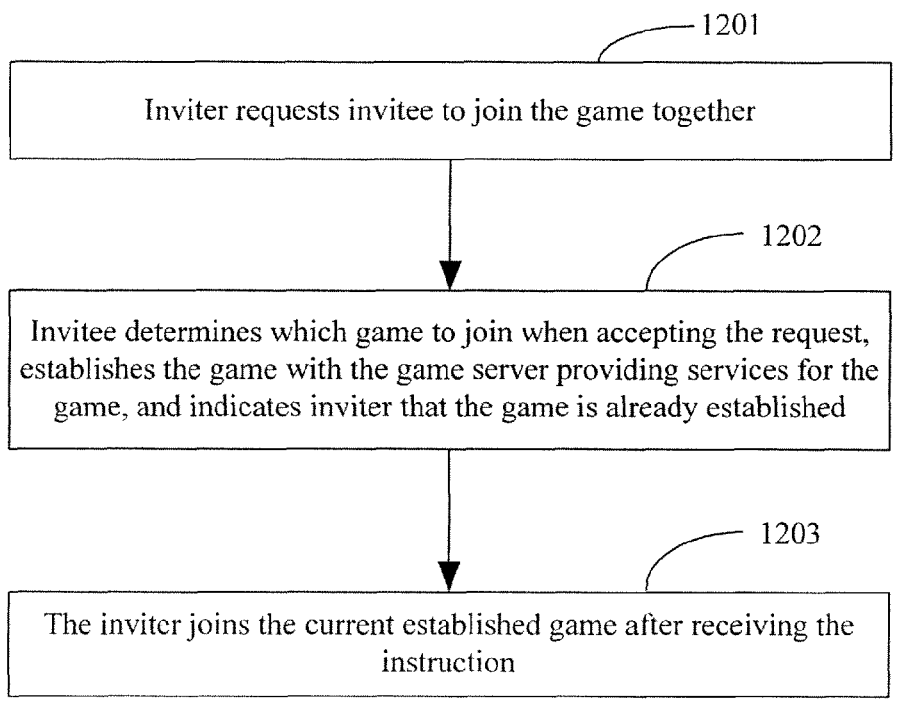
FIG. 12 is a flowchart illustrating a method for joining an online game in accordance with Embodiment 11 of the present invention.

FIG. 12 is a flowchart illustrating a method in accordance with Embodiment 11 of the present invention. With reference to FIG. 12, the method is described below. In Block 1201, an inviter requests an invitee to join a game together; in Block 1202, the invitee determines which game to join when accepting the request, establishes the game with the game server providing services for the game, and indicates the inviter that the game is already established; in Block 1203, the inviter joins the current established game after receiving the instruction.

Figure 13:
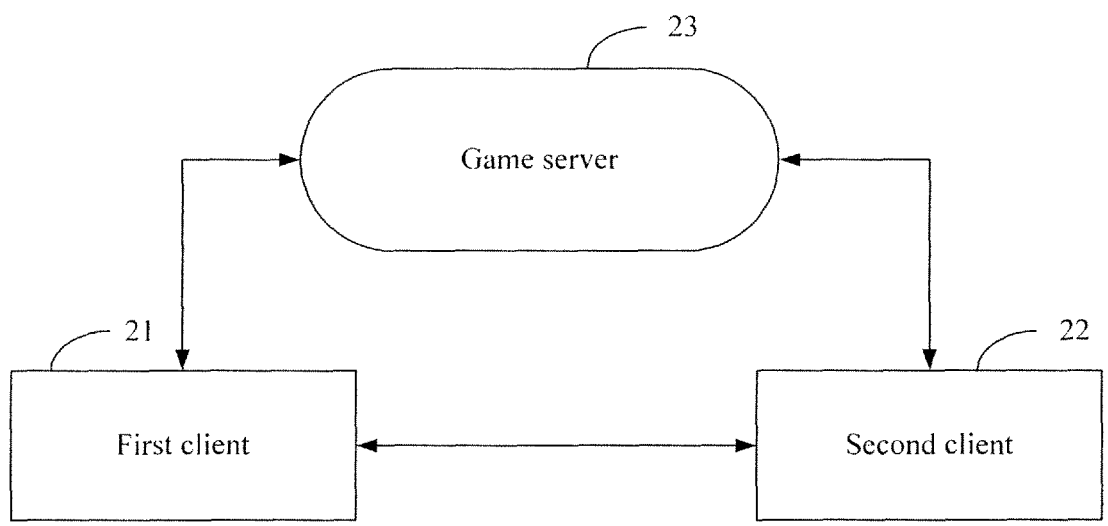
FIG. 13 is a flowchart illustrating a method for joining an online game in accordance with Embodiment 12 of the present invention.

In addition, with reference to FIG. 13, which is a schematic diagram illustrating a structure of a system in accordance with Embodiment 12 of the present invention, the system includes: a first client 21, a second client 22 and a game server 23 (also called a game serving system in some cases). The first client 21 sends a request of joining a game to the second client 22; accesses the game server 23 providing services for the current game after receiving the instruction that the current game is already established; and joins the current established game. The second client 22 receives the request sent by the first client 21; determines which game to join when accepting the request, and interacts with the game server 23 providing services for the current game to establish the current game; indicates the first client 21 that the current game is already established after the current game is established successfully.

It should be noted that a game client in the first client or the second client in the present embodiment may include a game lobby client and various clients supporting different kinds of games. Accordingly, the game server may include a game lobby server and various game servers providing services for different kinds of games.

According to the procedure illustrated in FIG. 12 and the structure illustrated in FIG. 13, it is obvious that the first client corresponds to the inviter, while the second client corresponds to the invitee. Herein, the inviter is an entity initiating the game in place of the inviter user, and the entity may be an apparatus such as a personal computer, a portable laptop or a mobile terminal with internet access function. The invitee is an entity initiating the game in place of the invitee user, and the entity may be an apparatus such as a personal computer, a portable laptop or a mobile terminal with internet access function. The entity corresponding to the inviter need not be the same type as the entity corresponding to the invitee. In other words, when the entity corresponding to the inviter is a portable laptop, the entity corresponding to the invitee may be a mobile terminal with internet access function.

Figure 14:
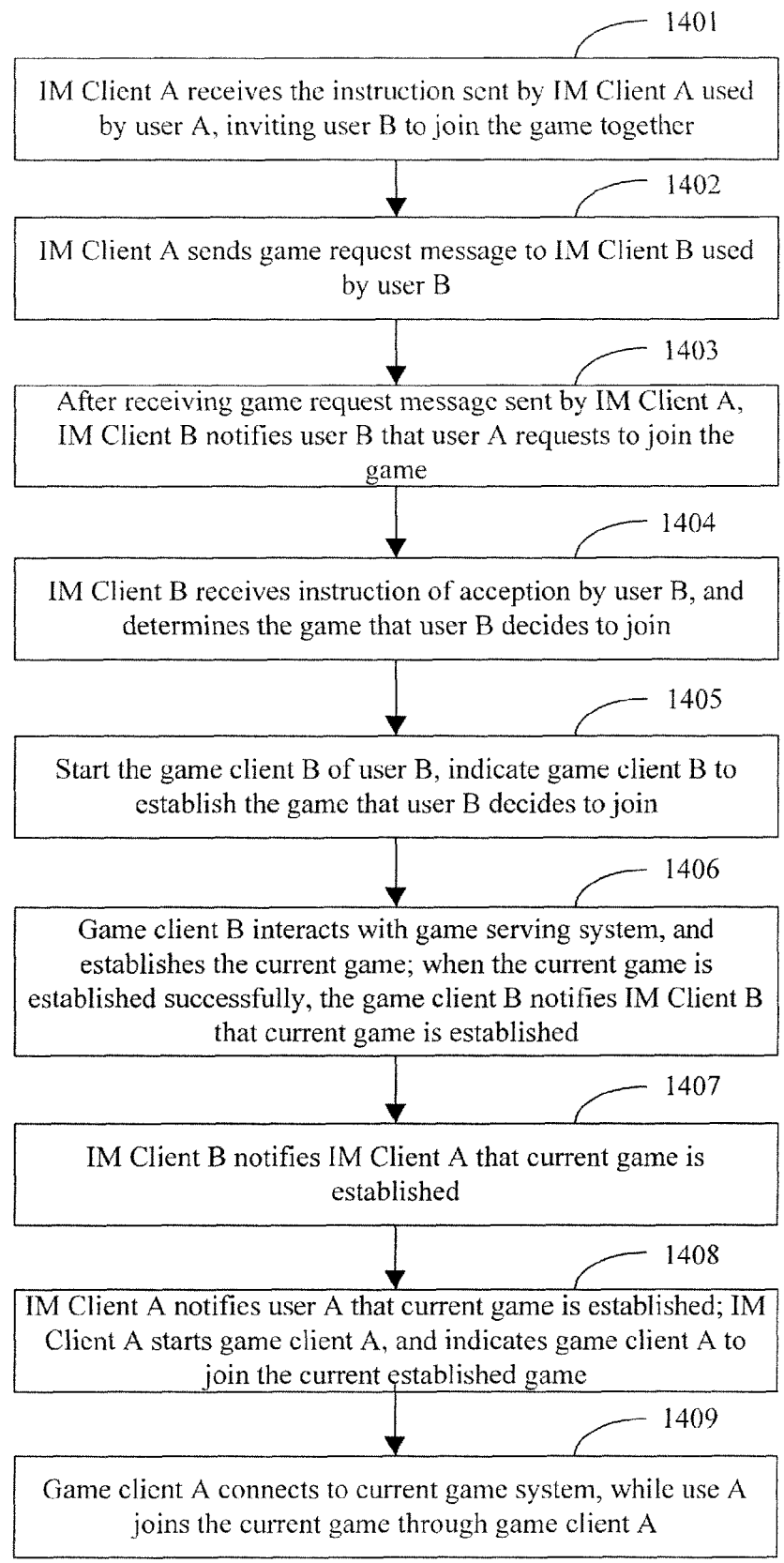
FIG. 14 is a flowchart illustrating a method for joining an online game in accordance with Embodiment 13 of the present invention.

FIG. 14 is a flowchart illustrating a method in accordance with Embodiment 13 of the present invention. In the embodiment, the entity corresponding to the inviter may include: the IM client and the game client used by the inviter user; the entity corresponding to the invitee may include: the IM client and the game client used by the invitee user. With reference to FIG. 14, the method is described below.

In Block 1401, an IM client A used by a user A receives an instruction sent by the user A indicating a user B to join a game together. The user A is the inviter user in this procedure, while the user B is the invitee user in this procedure.

The instruction sent by the user A to the IM client A may include the game, such as tetris or lord card which the user A invites the user B to join together; or the instruction does not include the game to join together, while it is the user B who decides which game to join, and in this case the instruction of the user A indicates the wish of playing with the user B regardless of which game. Certainly, the user A may also give an acceptable scope of games in the instruction, and the acceptable scope of games may include two or more kinds of games, such as tetris, lord card, the game of Go or military chess, which means that the user B may choose any one from the tetris, lord card, the game of Go and military chess, and whichever selected by the user B is acceptable to the user A.

The user A may send the instruction to the IM client A used by itself by the following way: adding a game option in the right-click friend menu of the IM client, the game option linking to a game list. The user A selects a user from a friend list to join the game firstly, and it is supposed that the user B is selected in the embodiment of the present invention. And then, the user A just needs to open the right-click friend menu of the user B, and to select a current desired game or scope of multiple games from the linked game list, or to choose no game at all. At last, the IM client A determines the current instruction of the user A according to the specific choice of the user A. Herein, the game list may be the one maintained by the game client A used by user A. In the embodiment of the present invention, the IM client A may link to the game list through a plug-in.

In Block 1402, the IM client A sends a game request message to the IM client B used by the user A.

According to different choices of the user A in Block 1401, contents contained in the game request message sent by the IM client A to the IM client B may be different, too. The contents that may be contained in the game request message include: a game scope or a specific game item, or no information concerning the types of games. In the present invention, the game request message may notify the user A of the game item by containing the game identity of a corresponding game. Similarly, the IM client A may also organize the game request message mentioned above in the manner of a plug-in.

In the present embodiment, the IM client A and the IM client B may interact with each other by the forwarding of the messenger server, or by way of P2P or UDP which is mainly determined by the network connection mode selected by the IM clients while starting.

In Block 1403, after receiving the game request message sent by the IM client A, the IM client B indicates the user B that the user A requests to join a game together.

Herein, the IM client B may pop out a window that provides options for the user A to choose. According to the contents contained in the game request message, the IM client B displays different options. For instance, if the inviter selects only one game, the IM client B provides the game item, as well as options of agreement and refusal respectively; if a game scope is contained in the game request message, the IM client B provides multiple game items in the game scope and an option of refusal; if no game item is provided in the game request message, the IM client B may provide options of agreement and refusal respectively. If no information of a game item is contained in the game request message, the user B determines the game that both the user B and the user A join together.

In Block 1404, the IM client B receives the instruction that the user B agrees, and determines that the user B decides to participate in the game currently.

Herein, when the IM client B indicates the user B that the user A requests to join the game together, the IM client B provides options of corresponding game items. Therefore, when receiving the instruction that the user B agrees, the IM client B can determine the game in which the user B decides to participate according to the contents of the instruction.

In Block 1405, the game client B used by the user B is started and is indicated to establish the game in which the user B decides to participate currently.

Herein, starting the game client B may refer to starting a game lobby client specifically, and the current game may be indicated to the game lobby client. The content indicated to the game lobby is the game identity of the current game. The specific operation of starting the game client B may be performed by the user B manually, or by the trigger of the IM client B.

Herein, when the user B starts the game client B manually, the user B may select the game in which the user B decides to participate from a list in the game client B. When the IM client B triggers to start the game client B, the IM client B needs to provide the game identity of the current game.

In Block 1406, the game client B interacts with the game server providing services for the current game to establish the current game. When the current game is successfully established, the game client B indicates the IM client B that the current game is already established.

Herein, the game client B interacts with the game server providing services for the current game to establish the current game through the following process: a game lobby server allocates game resources needed by the current game. The game resources allocated by the game lobby server for the current game may be determined by the user B; for instance, the user B accesses the game lobby server through the game client B, selects a game server providing services for the current game as well as a specific game room from the game lobby. During the process, what the game lobby server does is: allocating corresponding resources according to the selection of the user B to the game that the user B requests to establish. Certainly, as an alternative, after the user B initiates the request, the resource allocation is completely performed by the game lobby server.

When the current game is established, the user B has joined the current game, and waits for the user A to join.

In Block 1407, the IM client B indicates the IM client A that the game to join is already established, and returns the identity of the current established game.

If only one game item is contained in the game request message sent in Block 1404, it is unnecessary to return the game identity to the IM client A in this Block, and only an instruction of success establishment need be returned to the IM client A. The reason is that under such circumstance, the user A can learn the current game established by the user B.

In Block 1408, the IM client A indicates the user A that the current game to join is already established. The game client A used by the user A is started and is indicated to join the current established game.

Herein, starting the game client A may be performed by the user A manually, or by the trigger of the IM client A. If it is the user A that starts the game client, the IM client needs to show the current established game to the user A in the case that the inviter user A provides multiple game items or provides no game items, so that the user may choose a game in the game client A conveniently.

In Block 1409, the game client A accesses the current game server, the user A joins the current game through the game client A. The user A and the user B together participate in the game established by the invitee user B.

To sum up, Blocks 1407~1409 mainly describe the process of the user A joining the current game after the user B has joined the game. The process of user A joining the current game may be implemented by the following two ways:

In one way, the IM client B further sends the game relevant information while indicating the IM client A that the game is already established. The game relevant information includes: resource occupation information of the game resources allocated for the current game by the game server, and the game identity The resource occupation information may be an identity of the game server providing services for the game, and a game room identity. Herein, if the game request message sent by the user A to the user B in Block 1401 contains the information of a game identity of a certain game, the game relevant information sent by the IM client B need not contain the game identity. After the game client A receives the game relevant information, the game client A accesses the game server corresponding to the identity of the game server, provides the game room identity for the game server so that the user A can enter the room and join the current game.

In another way, when the IM client B indicates the game client B to establish the current game in Block 1405, the instruction further contains the identity of the user A. The identity of the user A may be the identity of the IM client used by the user A. In Block 1408, while the game server allocates the game resources occupied by the current game, the game server further records the identity of an inviter that can access the game resources. At last, when the game client A logs onto the current game server, the game server obtains the identity of the current inviter and provides the game resources for the inviter and pulls the inviter user into the current established game.

Figure 15:
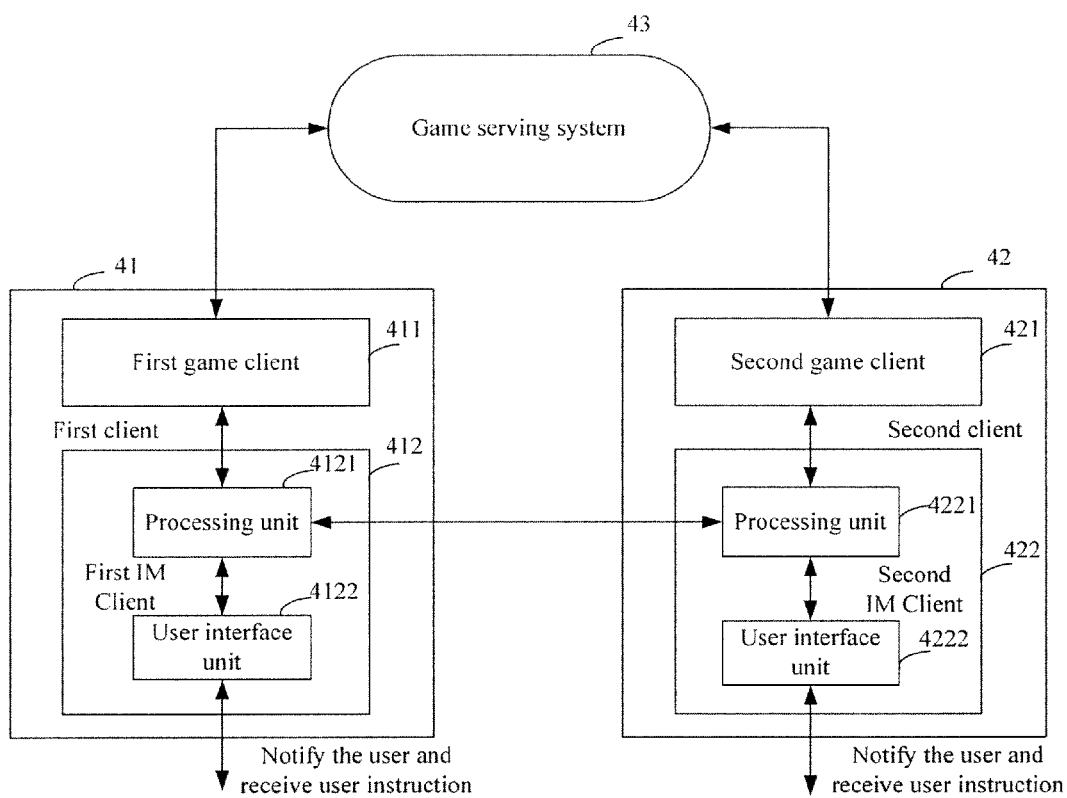
FIG. 15 is a schematic diagram illustrating a structure of an apparatus in accordance with Embodiment 14 of the present invention.

FIG. 15 is a schematic diagram illustrating a structure of a system in accordance with Embodiment 13 of the present invention. With reference to FIG. 15, the system includes: a first client 41, a second client 42 and a game server 43 (also called a game serving system 43 as shown in FIG. 15). The first client 41 includes a first IM client 412 and a first game client 411; the second client 42 includes a second IM client 422 and a second game client 421.

The first IM client 412 sends to the second IM client 422 a request of joining the game, and indicates the first game client 411 to join a current game after receiving from the second IM client 422 an instruction that the current game is already established. The first game client 411 receives the instruction sent by the first IM client 412, accesses the game server 43 that provides services for the current game, and joins the current game. The second IM client 422 receives the request sent by the first IM client 412; determines which game to join when accepting the request, and indicates the second game client 421 to establish the current game. After receiving the instruction that the current game is already established sent by the second game client 421, the second IM client 422 indicates the first IM client 412 that the game is already established. The second game client 421 receives the instruction sent by the second IM client 422, and interacts with the game server 43 providing the game services so as to establish the game; and after the game is established successfully, indicates the second IM client that the IM client 422 is already established.

Herein, the first IM client 412 may include: a user interface unit 4122 and a processing unit 4121. The user interface unit 4122 receives the instruction requesting the invitee user to participate in the game from the inviter user using the first IM client 412, and indicates the processing unit 4121 to process the request. The processing unit 4121 receives the instruction sent by the user interface unit 4122, and sends a request of joining the game to the second IM client 422 in which the invitee user is located; and after receiving the instruction that the current game is established from the second IM client 422, indicates the first game client 411 to participate in the current established game. In addition, after receiving the instruction that the game is established, the processing unit 4121 further sends a request success instruction to the user interface unit 4122. The user interface unit 4122 receives the request success instruction, and indicates the inviter user that the request is successful.

Herein, the second IM client may include: a user interface unit 4222 and a processing unit 4221. The processing unit 4221 receives the request of joining the game sent by the first IM client 412 in which the inviter user is located, and indicates the current request of joining the game to the user interface unit 4222. After receiving the instruction that the invitation of inviter user is accepted from the user interface unit 4222, the processing unit 4221 indicates the second game client 421 to establish the current game. After receiving the instruction that current game is already established sent by the second game client 421, the processing unit 4221 indicates the first IM client that the current game is established. The user interface unit 4222 receives the instruction sent by the processing unit 4221, and notifies the current request of participating in the game to the invitee user of the second IM client 422; receives the instruction that the invitee user accepts the request, determines the game to participate currently according to the received instruction, and indicates the processing unit 4221 to establish the game to participate currently.

In the technical scheme of the above embodiment the present invention, it is the invitee that establishes the game in which the invitee participates together with the inviter, and the invitee thereby has the initiative of establishing the game, and the invitees is relatively more satisfied. Besides, comparing with the existing technique, the technical scheme of the present invention reduces the number of times of the interaction between the inviter and the invitee, and the inviter and the invitee can thus join a game together more quickly, and thus system resources are effectively saved.

In addition, in the technical scheme of the embodiments of the present invention, the inviter does not start the game lobby until the invitee user agrees to join the game, and it is the game lobby that starts the game client to get ready for joining the game. Thereby, it is guaranteed that the inviter user need not unnecessarily start the game in the case that the invitee user does not agree to join the game, which can better save the processing resources of the user side of the inviter. Meanwhile, the inviter user selects an invitee user with a certain preference and invites the selected invitee user by way of an instant message, so that the network transmission processing resources may be effectively saved.

Obviously, those skilled in the art may make numerous changes and variations on the technical scheme of the present invention without departing from the spirit and scope thereof. Accordingly, it is intended that the present invention includes the changes and variations in case that such changes and variations come within the scope as set forth in the appended claims and the equivalent techniques thereof.

What is claimed is:

1. A method for joining an online game, comprising:
   generating, by an instant messaging (IM) client in a user device of an inviter, a first message and sending the first message to an IM client in a user device of an invitee, wherein the first message is to invite the invitee to join an online game together with the inviter;
   determining, by the IM client in the user device of the invitee, an online game to be participated after the IM client in the user device of the invitee receives the first message and the invitee agrees to join the online game together with inviter;
   starting, by the IM client in the user device of the invitee, a game client in the user device of the invitee after the invitee agrees to join the online game, and instructing the game client in the user device of the invitee to establish the determined online game;
   requesting, by the game client in the user device of the invitee, the server providing the determined online game to allocate the game resources;
   indicating, by the IM client in the user device of the invitee, the IM client in the user device of the inviter that the determined online game is already established;
   starting, by the IM client in the user device of the inviter, a game client in the user device of the inviter after being indicated that the determined online game is already established;
   accessing, by the game client in the user device of the inviter, the server providing services for the determined online game; and
   joining, by the game client in the user device of the inviter and that in the user device of the invitee respectively, the inviter and the invitee respectively into the determined online game.

2. The method according to claim 1,
   wherein said determining, by the IM client in the user device of the invitee, the online game to be participated comprises:
   if the first message contains one game identity, determining the online game corresponding to the one game identity as the one to be participated; or,
   if the first message contains identities of multiple online games, selecting one online game from the multiple online games as the one to be participated; or,
   if the first message contains no game identity, determining one online game randomly as the one to be participated.

3. The method according to claim 1, wherein
   the IM client in the user device of the invitee indicates the IM client in the user device of the inviter that the online game is already established by an instruction, wherein the instruction comprises resource occupation information of the server allocating the game resources for the current game.

4. The method according to claim 1, wherein the game client in the user device of the invitee further sends an identity of the inviter when requesting the server to establish the online game; and
   the server further records the identity of the inviter able to access the game resources when allocating the game resources for the online game;
   wherein, before said joining, by the game client in the user device of the inviter, the inviter into the determined online game, the server determines whether the identity of the inviter has been recorded, and provides the game resources for the inviter upon determining that the identity of the inviter has been recorded.

5. A method for joining an online game, comprising:
   generating, by an instant messaging (IM) client in a user device of an inviter, a first message and sending the first message to an IM client in a user device of an invitee, wherein the first message is to invite the invitee to join an online game together with the inviter;
   starting, by the IM client in the user device of the inviter, a game client in the user device of the inviter after receiving from the IM client in the user device of the invitee a confirmation message indicating that the invitee agrees to join the online game;
   requesting, by the game client in the user device of by the inviter, a server providing the online game to establish the online game;
   allocating, by the server, for the online game the game resources to be occupied by the online game;

sending, by the IM client in the user device of the inviter, a second message to the IM client in the user device of the invitee to indicate the invitee that the online game is already established;

starting, by the IM client in the user device of the invitee, a game client in the user device of the invitee after receiving the second message;

accessing, by the game client in the user device of the invitee, the server providing services for the online game to request for joining the online game;

providing, by the server, the game resources for the invitee, and, joining, by the game client in the user device of the inviter and that in the user device of the invitee respectively, the inviter and the invitee respectively into the online game.

6. The method according to claim 5, wherein the generating, by the IM client in the user device of the inviter the first instant message comprises:

providing, by the IM client or the game client in the user device of the inviter, an online game list for the inviter; and generating, by the IM client in the user device of the inviter, the first message upon the inviter selecting an online game from the online game list;

wherein the first message generated comprises description information configured to describe the online game selected by the inviter.

7. The method according to claim 5, wherein the invitee, the IM client in the user device of which the first message generated is sent to, is selected by the inviter.

8. The method according to claim 5, wherein the IM client in the user device of the invitee returns the confirmation message through:

parsing, by the IM client in the user device of the invitee, the description information comprised in the first message and displaying the parsed description information to the invitee; and generating, by the IM client in the user device of the invitee, the instant confirmation message and sending the confirmation message to the IM client in the user device of the inviter after the invitee indicates agreeing to join the online game.

9. The method according to claim 1, wherein the requesting, by the game client in the user device of the inviter, the server providing the online game to establish the online game comprises:

determining, by the game client in the user device of the inviter, according to description information of the online game selected by the inviter, a game server providing the online game from a network side; and requesting the game server providing the online game to allocate the game resources.

10. The method according to claim 9, wherein the game client in the user device of the inviter selects the game server corresponding to a game server identity preset by the inviter from game servers providing the online game at the network side.

11. The method according to claim 9, wherein the game client in the user device of the inviter selects the game server with least online players from game servers providing the online game at the network side.

12. The method according to claim 1, wherein the game client in the user device of the inviter adds the inviter to the online game according to information preset by the inviter to join the online game.

13. The method according to claim 1, wherein the joining, by the game client in the user device of the inviter, the inviter into the online game comprises:

sending, by the server to a game client in the user device of the inviter, join information through the network after allocating the game resources successfully, wherein the join information is configured to indicate the inviter to join the online game; and adding, by the game client in the user device of the inviter, the inviter to the online game according to the join information sent by the server.

14. The method according to claim 1, wherein the joining, by the game client in the user device of the invitee, the invitee into the online game comprises:

sending, by the game client in the user device of the inviter, an invitee identity to the server through the network after the server successfully allocates the game resources;

sending, by the server, join information to the game client in the user device of the invitee corresponding to the invitee identity, wherein the join information is configured to indicate the invitee to join the online game; and adding, by the game client in the user device of the invitee, the invitee to the online game according to the join information sent by the server.

15. The method according to claim 5, further comprising:

sending, by the server, join information to the IM client in the user device of the inviter after successfully allocating the game resources, wherein the join information indicates that an invitee is to join the online game;

wherein the second instant message sent by the IM client in the user device of the inviter comprises the join information;

the joining, by the game client in the user device of the invitee, the invitee into the online game comprises parsing, by the IM client in the user device of the invitee, the second instant message to obtain the join information, and sending the join information to the game client in the user device of the invitee; and adding, by the game client in the user device of the invitee, the invitee user to the online game according to the join information received.

16. The method according to claim 1, wherein the joining, by the game client in the user device of the invitee, the invitee into the online game comprises:

storing, by the server, game relevant information for indicating the game resources after successfully allocating the game resources;

joining, by the game client in the user device of the invitee, the invitee into the online game established currently according to the game relevant information provided by the server.

17. The method according to claim 16, wherein the allocating, by the server, the game resources for the online game comprises: allocating, by the server, the game resources for the online game during the inviter being joined into the online game.

18. The method according to claim 5, wherein the IM client in the user device of the inviter, sends the second message to the IM client in the user device of the invitee to indicate the invitee that the online game is already established after the invited being joined in the online game;

the game client in the user device of the invitee accesses the server through the network to request for joining the online game after the IM client in the user device of the invitee receives the second message.

19. The method according to claim 16, further comprising:
indicating, by the server, the game client in the user device of the inviter that the online game is established after allocating the game resources for the online game;
indicating, by the IM client in the user device of the inviter, the IM client in the user device of the invitee that the online game is established by an instruction;
requesting, by the game client in the user device of the inviter, the server for joining the online game; and
requesting, by the game client in the user device of the invitee receiving the instruction, the server for joining the online game.

20. The method according to claim 16, further comprising:
configuring, by the server, requirements for joining the online game after allocating the game resources for the online game;
wherein the joining, by the game client in the user device of the inviter, the inviter into the online game established currently according to the game relevant information provided by the server comprises
requesting, by the game client in the user device of the invitee, the server for joining the online game,
sending, by the server, the game relevant information stored in itself to the game client in the user device of the invitee after determining that the invitee meets the requirements, and
joining, by the game client in the user device of the invitee, the invitee into the online game according to the game relevant information received.

21. The method according to claim 20, further comprising:
sending, by the game client in the user device of the inviter, the identity of each invitees to participate in the online game while requesting the server to establish the online game;
wherein the configuring the requirements for joining the online game comprises recording the identities of the invitees; and
wherein the determining, by the server, that the invitee meets the requirements comprises determining, by the server, whether the identity of the invitee comprised in the request for joining the online game sent from the user device of the invitee has been recorded, and determining that the invitee meets the requirements if the identity of the invitee has been recorded.

22. The method according to claim 1, further comprising:
returning, by the server, a joining success notification to the game client for joining the online game of the invitee after the invitee successfully joins the online game; and
parsing and displaying, by the game client for joining the online game of the invitee, the joining success notification sent by the server for the invitee.

23. The method according to claim 6, wherein the description information for describing the online game is identity information of the online game.

24. A user device of an inviter, comprising an Instant Messaging (IM) client, a game client, a processor and a memory storing machine readable instructions executable by the processor, wherein while the instructions are executed by the processor:
the IM client is to generate a first instant message according to an online game selected by the inviter and send the first instant message to an IM client in a user device of an invitee, wherein the first instant message contains description information for describing the online game selected by the inviter, start the game client after receiving an instant confirmation message indicated that the invitee agrees to join the online game from the IM client in the user device of the invitee; and send a second message to the IM client in the user device of the invitee to indicate the invitee that the online game is already established,
the game client, configured is to, after the user device of the inviter receives the instant confirmation message returned by the IM client in the user device of the invitee, request according to the description information of the online game selected by the inviter a server providing the online game to allocate game resources, and add the inviter user to the online game after the game resources are successfully allocated.

25. The user device according to claim 24, wherein the IM client comprises:
a first instant message generating unit, while the instructions are executed by the processor, to generate the first instant message according to the online game selected by the inviter; and
a first instant message sending unit, while the instructions are executed by the processor, to send the first instant message generated by the first instant message generating unit to the IM client in the user device of the invitee.

26. The user device according to claim 25, wherein the game client comprises:
a game resource requesting unit, while the instructions are executed by the processor, to, after receiving the instant confirmation message returned by the IM client in the user device of the invitee indicating that the invitee agrees to join the online game selected by the inviter, request according to the description information of the online game selected by the inviter the server at the network-side providing the online game to allocate the game resources; and
a game joining unit, while the instructions are executed by the processor, to add the inviter to the online game after the server successfully allocates the game resources.

27. The user device according to claim 26, wherein the game resource requesting unit, while the instructions are executed by the processor, is to request a game server which corresponds to a game server identity preset by the inviter user and which provides the online game at the network side to allocate the game resources.

28. The user device according to claim 26, wherein the game resource requesting unit, while the instructions are executed by the processor, is to select a game server with the least online players from game servers providing the online game at the network side, and to request the selected game server to allocate the game resources.

29. The user device according to claim 26, wherein the game joining unit, while the instructions are executed by the processor, is to add the inviter to the online game according to information preset by the inviter for joining the online game.

30. The user device according to claim 26, wherein the game joining unit comprises:
a receiving subunit, while the instructions are executed by the processor, to receive join information sent from the server for indicating the inviter to join the online game after the server at the network-side successfully allocates the game resources; and
a joining subunit, while the instructions are executed by the processor, to add the inviter to the online game provided by the server according to the join information received by the receiving subunit.

31. The user device according to claim 24, wherein the IM client comprises:
an invitee join information receiving unit, while the instructions are executed by the processor, to receive join information indicating the invitee to join the online game, wherein the join information is sent from the server providing the online game;

a second instant message generating unit, while the instructions are executed by the processor, to generate a second instant message, wherein the second instant message comprises the join information received by the invitee join information receiving unit indicating the invitee to join the online game; and a second instant message sending unit, while the instructions are executed by the processor, to send the second instant message generated by the second instant message generating unit to the IM client in the user device of the invitee.

32. A user device of an invitee, comprising an Instant Messaging (IM) client, a game client, a processor and a memory storing machine readable instructions executable by the processor, wherein while the instructions are executed by the processor:

the IM client is to determine an online game to be participated after the IM client receives a first message which is to invite the invitee to join an online game together with the inviter from an IM client in the user device of the inviter and the invitee agrees to join the online game together with inviter start the game client after the invitee agrees to join the online game, instruct the game client to establish the determined online game, and indicate the IM client in the user device of the inviter that the determined online game is already established after the server allocates the game resource for the determined online game;

the game client is to request a server providing the determined online game to allocate game resources, and to add the invitee to the online game after the server allocates the game resources for the determined online game.

33. A system for joining an online game, comprising: a first client at a user side comprising a first Instant Messaging (IM) client and a first game client, a second client at the user side comprising a second IM client and a second game client, and a server at a network side; each of the first client, the second client and the server comprising a processor and a memory storing machine readable instructions executable by the processor, wherein while the instructions are executed by the respective processor:

the first IM client in the first client is to generate a first message which is to invite an invitee to join an online game together with an inviter, send to the second client the first message, and after receiving an instruction sent from the second client indicating that the online game is established, start the first game client in the first client and instruct the first game client to join the inviter into the online game;

the first game client in the first client is to access the server providing services for the online game through a network as instructed by the first IM client, and join the inviter into the online game established currently;

the second IM client in the second client is to receive the request sent from the first client, determine the online game to join when the invitee agrees to join the online game, instruct the second game client to establish the online game, and after receiving an instruction sent from the second game client indicating that the determined online game is established, indicate the first IM client in the first client that the online game is established successfully by an instruction; and the second game client in the second client is to receive the instruction sent from the second IM client, interact with the server providing services for the online game through the network to establish the online game, indicate the second IM client that the online game is established by sending an instruction after the online game is successfully established, and join the invitee into the online game established currently.

34. A user device comprising an Instant Messaging (IM) client according to claim 24 for joining an online game, a processor and a memory storing machine readable instructions executable by the processor, the IM client comprising a user interface unit and a processing unit; wherein while the instructions are executed by the processor, the user interface unit is to receive a request for inviting an invitee to join an online game, wherein the request is sent by an inviter corresponding to the IM client where the inviter is located, and to indicate the processing unit to process the request by an instruction; and the processing unit is to receive the instruction sent by the user interface unit, send a request for joining the online game to a user device of an invitee, and after receiving an instruction that the online game is established from the user device of the invitee, indicate a game client corresponding to the inviter user to join the online game established currently.

35. The user device according to claim 34, wherein the processing unit, while the instructions are executed by the processor, is further to send a request success instruction to the user interface unit after receiving the instruction that the online game is established;

the user interface unit, while the instructions are executed by the processor, is further to receive the request success instruction, and indicate the inviter that the request is accepted successfully.

36. A user device comprising an Instant Messaging (IM) client according to claim 32 for joining an online game, a memory and a processor storing machine readable instructions executable by the processor, the IM client comprising a user interface unit and a processing unit; wherein while the instructions are executed by the processor, the processing unit is to receive a request for joining an online game sent by a user device of an inviter, and indicate the request for joining the online game to the user interface unit, after receiving an instruction that the invitee accepts the request of the inviter from the user interface unit, indicate a game client corresponding to the invitee to establish the online game, and after receiving an instruction that the online game is established from the game client, indicate the user device of the inviter that the online game is established by an instruction; and the user interface unit is to receive the request for joining the online game sent by the processing unit, and indicate the request for joining the online game to the invitee, receive the instruction that the invitee accepts the request, and determine the online game to join according to the instruction received, and indicate the processing unit to establish the online game to join.

37. A system for joining an online game, comprising: a first client at a user side comprising a first Instant Messaging (IM) client and a first game client, a second client at the user side comprising a second IM client and a second game client, and a server at a network side; each of the first client, the second client and the server comprising a processor and a memory storing machine readable instructions executable by the processor; wherein while the instructions are executed by the respective processor:

the first IM client in the first client is to generate a first message which is to invite an invitee to join an online game together with an inviter, send the first message to the second IM client in the second client, start the first game client in the first client after receiving from the second IM client in the second client a confirmation message indicating that the invitee agrees to join the online game, indicate the first game client to establish the online game by an instruction, receive an instruction sent by the first game client that the online game is established, and send to the second IM client in the second client a second message indicating that the online game is established after receiving the instruction from the first game client indicating that the online game is established;

the first game client is to receive the instruction sent by the first IM client indicating the first game client to establish the online game, send to the server through a network a request for establishing the online game, receive relevant information of the online game sent by the server through the network, and add the inviter to the online game according to the relevant information of the online game; and further to indicate the first IM client that the online game is established by an instruction;

the second IM client in the second client is to receive the second message sent by the first client indicating that the online game is established, and start the second game client in the second client and indicate the second game client to establish the online game by an instruction;

the second game client in the second client is to receive the instruction sent by the second IM client indicating the second game client to establish the online game, and send a request for joining the online game to the server through the network; receive the relevant information of the online game sent by the server through the network, and add the invitee to the online game according to the relevant information of the online game; and the server is to receive the request for establishing the online game from the first game client in the first client through the network, allocate game resources for the online game, store the relevant information of the online game for indicating the game resources, configure requirements for joining the online game after allocating the game resources for the online game, receive the request sent by the second client through the network, send the relevant information of the online game stored in itself to the first game client in the first client, and send the relevant information of the online game stored in itself to the second game client in the second client after determining that the second IM client meets the requirements for joining the online game.

38. The system according to claim 37, wherein the first game client is further to send an identity of the second IM client participating in the online game while requesting the server to establish the online game;

the server is to record any identity received, determine whether the identity of the second IM client is recorded, and determine that the second IM client meets the requirements if the identity of the second IM client is recorded.

\* \* \* \* \*